US012693758B2

(12) United States Patent
You

(10) Patent No.: US 12,693,758 B2
(45) Date of Patent: Jul. 28, 2026

(54) DISPLAY DEVICE AND ELECTRONIC DEVICE INCLUDING THE DISPLAY DEVICE

(71) Applicant: Samsung Display Co., Ltd., Yongin-si (KR)

(72) Inventor: Chun Gi You, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/177,319

(22) Filed: Apr. 11, 2025

(65) Prior Publication Data

US 2025/0383733 A1 Dec. 18, 2025

(30) Foreign Application Priority Data

Jun. 18, 2024 (KR) ........................ 10-2024-0079021
Sep. 10, 2024 (KR) ........................ 10-2024-0123265

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04111* (2013.01)

(58) Field of Classification Search
None
See application file for complete search history.

(56) References Cited

U.S. PATENT DOCUMENTS 10,109,686 B2 10/2018 Oh et al.
11,537,226 B2 12/2022 Lee et al.

11,567,605 B2 1/2023 Cho et al.
11,983,359 B2 5/2024 Yoo et al.
2014/0182894 A1* 7/2014 Liu ..................... G06F 3/04164
174/251
2018/0061897 A1* 3/2018 Oh ........................ G06F 3/0412
(Continued)

FOREIGN PATENT DOCUMENTS

CN 102279674 B * 6/2013
CN 113097285 B * 4/2024 ............. H10K 59/12
(Continued)

*Primary Examiner* — Kenneth Bukowski
(74) *Attorney, Agent, or Firm* — Womble Bond Dickinson (US) LLP

(57) ABSTRACT

A display device includes a display panel including sub-pixels, and an input sensor on the display panel. The input sensor includes a sensing electrode array including a first sensing electrode array and a second sensing electrode array, and a transmission line electrically connected to the sensing electrode array. The transmission line includes a lower transmission line, and an upper transmission line electrically connected to the lower transmission line through a line contact hole. The first sensing electrode array includes a first sensing electrode and a first bridge electrode electrically connected to the first sensing electrode. The second sensing electrode array includes a second sensing electrode and a second bridge electrode electrically connected to the second sensing electrode. The lower transmission line, the upper transmission line, the first sensing electrode, the first bridge electrode, the second sensing electrode, and the second bridge electrode, refer to those described in this specification.

20 Claims, 32 Drawing Sheets

(56)          References Cited

U.S. PATENT DOCUMENTS

| | | | | |
|---|---|---|---|---|
| 2018/0182822 A1* | 6/2018 | Seo | .................. | H10K 59/123 |
| 2018/0308903 A1* | 10/2018 | Jeong | .............. | H10K 59/8791 |
| 2019/0074328 A1* | 3/2019 | Park | .................. | G06F 3/0446 |
| 2019/0294278 A1* | 9/2019 | Kim | .................. | G06F 3/04164 |
| 2021/0011581 A1* | 1/2021 | Choi | .................. | G06F 3/0443 |
| 2021/0191566 A1* | 6/2021 | Yang | .................. | G06F 3/0446 |
| 2021/0200363 A1* | 7/2021 | Lee | .................. | H10K 59/121 |
| 2021/0255738 A1* | 8/2021 | Kim | .................. | G06F 3/0445 |
| 2021/0318788 A1* | 10/2021 | Cho | .................. | G06F 3/04162 |
| 2021/0357057 A1* | 11/2021 | Kim | .................. | G06F 3/0443 |
| 2021/0366998 A1* | 11/2021 | Kim | .................. | G06F 3/0412 |
| 2023/0205357 A1* | 6/2023 | Yoo | .................. | G06F 3/0446 |
| | | | | 345/173 |

FOREIGN PATENT DOCUMENTS

| | | | |
|---|---|---|---|
| KR | 10-1086162 | B1 | 11/2011 |
| KR | 10-1908982 | B1 | 10/2018 |
| KR | 10-2021-0083005 | A | 7/2021 |
| KR | 10-2021-0127295 | A | 10/2021 |
| KR | 10-2023-0097459 | A | 7/2023 |

* cited by examiner

NSA: TRA, PDA
SP: SP1, SP2

SP1: TX1, TX2, BR_TX
SP2: RX1, RX2, BR_RX

TR1: TR1L, TR1U
TPD1: TPD1L, TPD1U

```
       ┌─────────┐
       │  START  │
       └────┬────┘
            ▼
    ┌───────────────┐
    │     1MASK     │
    └───────┬───────┘
            ▼
    ┌───────────────┐
    │     2MASK     │
    └───────┬───────┘
            ▼
    ┌───────────────┐
    │     3MASK     │
    └───────┬───────┘
            ▼
    ┌───────────────┐
    │     4MASK     │
    └───────┬───────┘
            ▼
    ┌───────────────┐
    │     5MASK     │
    └───────┬───────┘
            ▼
       ┌─────────┐
       │   END   │
       └─────────┘
```

FIG. 14

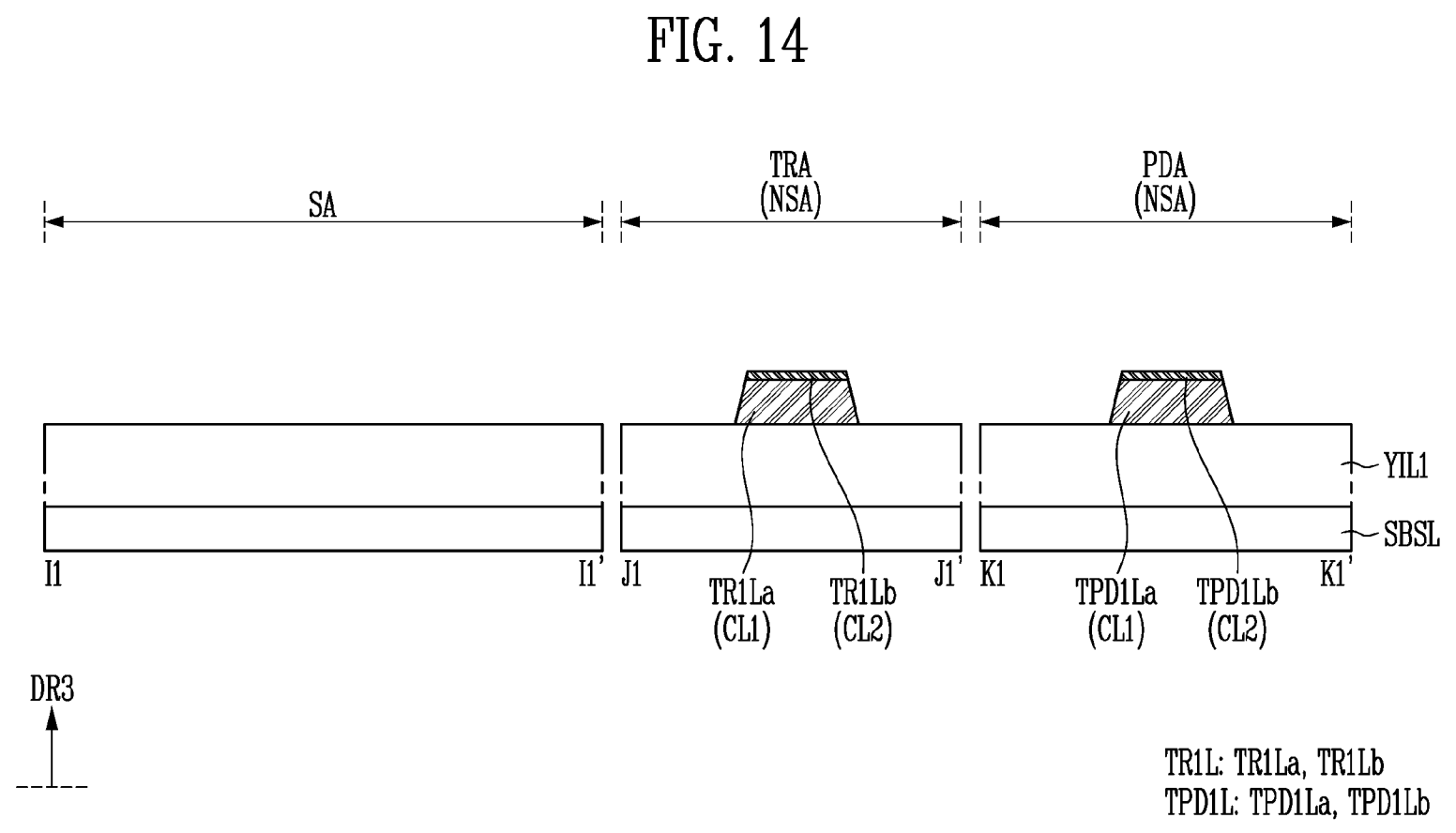

YIL1

SBSL

PDA
(NSA)

TPD1Lb
(CL2)

TPD1La
(CL1)

K1

K1

TRA
(NSA)

TR1Lb
(CL2)

TR1La
(CL1)

J1'

J1

I1'

SA

I1

DR3

TR1L: TR1La, TR1Lb
TPD1L: TPD1La, TPD1Lb

FIG. 15

BR_RX: BR_RXa, BR_RXb
TR2L: TR2La, TR2Lb
TPD2L: TPD2La, TPD2Lb

BR_RX: BR_RXa, BR_RXb
TR2L: TR2La, TR2Lb
TPD2L: TPD2La, TPD2Lb

BR_RX: BR_RXa, BR_RXb
TR2L: TR2La, TR2Lb
TPD2L: TPD2La, TPD2Lb

BR_RX: BR_RXa, BR_RXb
TR2L: TR2La, TR2Lb
TPD2L: TPD2La, TPD2Lb

BR_RX: BR_RXa, BR_RXb
TR2L: TR2La, TR2Lb
TPD2L: TPD2La, TPD2Lb

DISPLAY DEVICE AND ELECTRONIC DEVICE INCLUDING THE DISPLAY DEVICE

CROSS-REFERENCE TO RELATED APPLICATION

The present application claims priority to and the benefit of Korean Patent Application No. 10-2024-0079021, filed on Jun. 18, 2024, in the Korean Intellectual Property Office, and Korean Patent Application No. 10-2024-0123265, filed on Sep. 10, 2024, in the Korean Intellectual Property Office, the entire disclosure of each of which is incorporated herein by reference.

BACKGROUND

1. Field

Aspects of some embodiments of the present disclosure relate to a display device and an electronic device including the display device.

2. Description of the Related Art

As information technology has developed, the importance of display devices, which provide a connection medium between users and information, has been highlighted. A display device may include a display panel for displaying images, and an input sensor for obtaining information (e.g., location of the input, etc.) about an input provided from a user (e.g., location of the input, etc.).

The above information disclosed in this Background section is only for enhancement of understanding of the background and therefore the information discussed in this Background section does not necessarily constitute prior art.

SUMMARY

When the components of the input sensor are damaged by external impact, external impurities, or high temperatures, the reliability of the display device may be relatively reduced.

Aspects of some embodiments of the present invention include a display device with relatively improved reliability.

A display device according to some embodiments of the present invention includes: a display panel including sub-pixels; and an input sensor on the display panel. According to some embodiments, the input sensor includes a sensing electrode array including a first sensing electrode array and a second sensing electrode array that are insulated from each other and intersect each other, and a transmission line electrically connected to the sensing electrode array. According to some embodiments, the transmission line includes a lower transmission line and an upper transmission line on the lower transmission line and electrically connected to the lower transmission line through a line contact hole formed in a sensing insulating layer. According to some embodiments, the lower transmission line includes a first layer comprising MoNb and a second layer on the first layer and including indium tin oxide (ITO). According to some embodiments, the upper transmission line includes a third layer including AlNd and a fourth layer on the third layer and including ITO. According to some embodiments, the first sensing electrode array includes a first sensing electrode including ITO and a first bridge electrode electrically connected to the first sensing electrode and including ITO. According to some embodiments, the second sensing electrode array includes a second sensing electrode including ITO and a second bridge electrode electrically connected to the second sensing electrode. According to some embodiments, the second bridge electrode includes a 2-1 bridge electrode layer including MoNb and a 2-2 bridge electrode layer on the 2-1 bridge electrode layer and including ITO.

According to some embodiments, the second layer may cover an upper surface of the first layer and may expose side surfaces of the first layer. According to some embodiments, the fourth layer may cover an upper surface and side surfaces of the third layer.

According to some embodiments, the third layer may be electrically connected to the second layer through the line contact hole formed in the sensing insulating layer interposed between the third layer and the second layer.

According to some embodiments, a plurality of line contact holes may be formed to electrically connect the third layer and the second layer.

According to some embodiments, the first sensing electrode may include a 1-1 sensing electrode and a 1-2 sensing electrode spaced apart from each other in the first direction.

According to some embodiments, the first bridge electrode may be on the same layer as the 1-1 sensing electrode and the 1-2 sensing electrode, and may be electrically connected to each of the 1-1 sensing electrode and the 1-2 sensing electrode.

According to some embodiments, the second sensing electrode may include a 2-1 sensing electrode and a 2-2 sensing electrode spaced apart from each other in a second direction intersecting the first direction.

According to some embodiments, the sensing insulating layer may be interposed between the second bridge electrode and the second sensing electrode. According to some embodiments, the 2-1 sensing electrode may be electrically connected to the second bridge electrode through a 2-1 electrode contact hole formed in the sensing insulating layer. According to some embodiments, the 2-2 sensing electrode may be electrically connected to the second bridge electrode through a 2-2 electrode contact hole formed in the sensing insulating layer.

According to some embodiments, the 2-2 bridge electrode layer may cover an upper surface of the 2-1 bridge electrode layer and may expose side surfaces of the 2-1 bridge electrode layer.

According to some embodiments, the 2-1 electrode contact hole may expose an upper surface of the 2-2 bridge electrode layer. According to some embodiments, the 2-2 electrode contact hole may expose the upper surface of the 2-2 bridge electrode layer, a side surface of the 2-2 bridge electrode layer, and a side surface of the 2-1 bridge electrode layer.

According to some embodiments, the input sensor may further include a sensing pad electrically connected to the sensing electrode array through the transmission line.

According to some embodiments, the sensing pad may include a first pad layer including MoNb, a second pad layer on the first pad layer and including ITO, and a third pad layer on the second pad layer and including ITO.

According to some embodiments, the second pad layer may cover an upper surface of the first pad layer and may expose side surfaces of the first pad layer.

According to some embodiments, the third pad layer may be electrically connected to the second pad layer through a pad contact hole formed in the sensing insulating layer interposed between the third pad layer and the second pad layer.

According to some embodiments, the input sensor may further include a protective layer on the third pad layer and including a pad opening exposing at least a portion of the third pad layer.

A display device according to some embodiments of the present invention includes a display panel and an input sensor on the display panel. According to some embodiments, the input sensor includes a sensing electrode in a sensing area, a transmission line in a line area around the sensing area, and a sensing insulating layer entirely in the sensing area and the line area. According to some embodiments, the transmission line includes a first metal layer including MoNb; a second metal layer on the first metal layer, electrically connected to the first metal layer, and including indium tin oxide (ITO); a third metal layer on the sensing insulating layer, electrically connected to the second metal layer through a line contact hole formed in the sensing insulating layer, and including AlNd; and a fourth metal layer on the third metal layer, electrically connected to the third metal layer, and including ITO. According to some embodiments, the sensing electrode includes: a sensing pattern on the sensing insulating layer and including ITO; and a bridge pattern under the sensing insulating layer, electrically connected to the sensing pattern, and including MoNb and ITO.

According to some embodiments, the second metal layer may cover an upper surface of the first metal layer and may expose side surfaces of the first metal layer. According to some embodiments, the fourth metal layer may cover an upper surface and side surfaces of the third metal layer.

According to some embodiments, the sensing pattern may include first sensing electrodes arranged in a first direction, and second sensing electrodes arranged in a second direction intersecting the first direction.

According to some embodiments, the second sensing electrodes may be electrically connected to the bridge pattern through an electrode contact hole formed in the sensing insulating layer.

According to some embodiments, the bridge pattern may include a first bridge pattern layer including MoNb; and a second bridge pattern layer including ITO, covering an upper surface of the first bridge pattern layer, and exposing side surfaces of the first bridge pattern layer.

An electronic device according to some embodiments of the present invention includes a processor to provide input image data, and a display device to display an image based on the input image data. According to some embodiments, the display device includes a display panel including subpixels, and an input sensor on the display panel. According to some embodiments, the input sensor includes a sensing electrode array including a first sensing electrode array and a second sensing electrode array that are insulated from each other and intersect each other, and a transmission line electrically connected to the sensing electrode array. According to some embodiments, the transmission line includes a lower transmission line and an upper transmission line on the lower transmission line and electrically connected to the lower transmission line through a line contact hole formed in a sensing insulating layer. According to some embodiments, the lower transmission line includes a first layer comprising MoNb and a second layer on the first layer and including indium tin oxide (ITO). According to some embodiments, the upper transmission line includes a third layer including AlNd and a fourth layer on the third layer and including ITO. According to some embodiments, the first sensing electrode array includes a first sensing electrode including ITO and a first bridge electrode electrically connected to the first sensing electrode and including ITO. According to some embodiments, the second sensing electrode array includes a second sensing electrode including ITO and a second bridge electrode electrically connected to the second sensing electrode. According to some embodiments, the second bridge electrode includes a 2-1 bridge electrode layer including MoNb and a 2-2 bridge electrode layer on the 2-1 bridge electrode layer and including ITO.

An electronic device according to some embodiments of the present invention includes a processor to provide input image data, and a display device to display an image based on the input image data. According to some embodiments, the display device includes a display panel, and an input sensor on the display panel. According to some embodiments, the input sensor includes a sensing electrode in a sensing area, a transmission line in a line area around the sensing area, and a sensing insulating layer entirely in the sensing area and the line area. According to some embodiments, the transmission line includes a first metal layer including MoNb; a second metal layer on the first metal layer, electrically connected to the first metal layer, and including indium tin oxide (ITO); a third metal layer on the sensing insulating layer, electrically connected to the second metal layer through a line contact hole formed in the sensing insulating layer, and including AlNd; and a fourth metal layer on the third metal layer, electrically connected to the third metal layer, and including ITO. According to some embodiments, the sensing electrode includes: a sensing pattern on the sensing insulating layer and including ITO; and a bridge pattern under the sensing insulating layer, electrically connected to the sensing pattern, and including MoNb and ITO.

In the display device according to some embodiments of the present invention, the transmission line may have a multilayer structure each including MoNb, AlNd, and ITO.

Accordingly, the reliability of the transmission line may be secured against external impact, external impurities, and high temperatures.

BRIEF DESCRIPTION OF THE DRAWINGS

FIGS. 11 to 31 are drawings for illustrating a manufacturing method of a display device according to some embodiments of the present invention.

DETAILED DESCRIPTION

Figure 1:
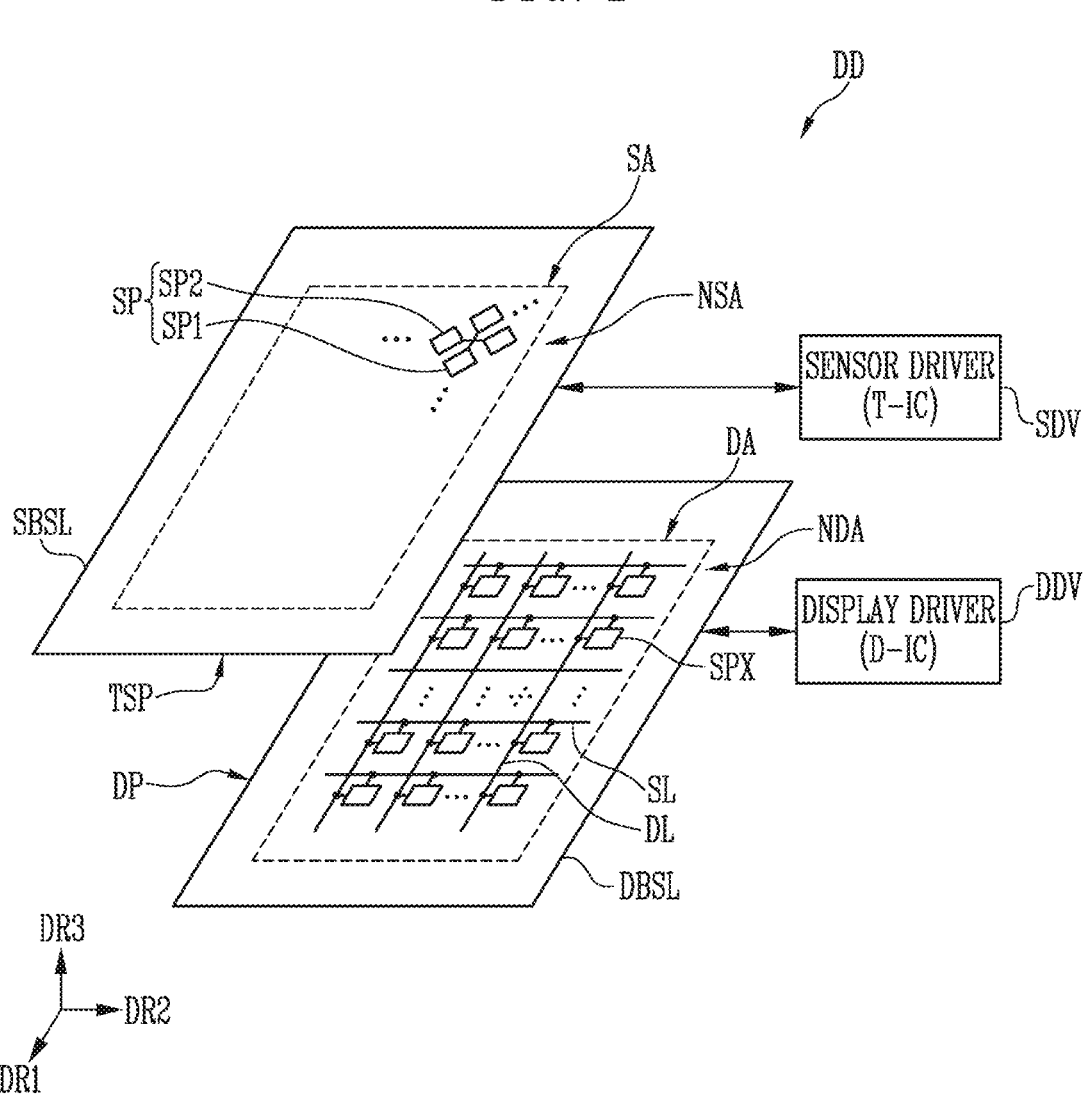
FIG. 1 and FIG. 2 are drawings for illustrating a display device according to some embodiments of the present invention.

Hereinafter, aspects of some embodiments according to the present invention will be described in detail with reference to the attached drawings. It should be noted that only the parts necessary to understand the operation according to the present disclosure will be described in the following description, and the description of other parts will be omitted to not obscure the gist of the present disclosure. Additionally, the present invention is not limited to the embodiments described herein and may be embodied in other forms. However, the embodiments described herein are provided to explain in detail enough to enable those skilled in the art to easily implement the technical idea of the present invention.

Throughout the specification, when a part is said to be "connected" to another part, this includes not only the case where it is "directly connected" but also the case where it is "indirectly connected" with another element interposed therebetween. The term used in this specification is for the purpose of describing the embodiments and is not intended to limit the present invention. In this disclosure below, when it is described that one "includes" some elements, it should be understood that it may include only those elements, or it may include other elements as well as those elements if there is no specific limitation. "At least one of X, Y, and Z", and "at least one selected from the group consisting of X, Y, and Z" may be interpreted as an X, a Y, a Z, or any combination (e.g., XYZ, XYY, YZ, and ZZ) of two or more among X, Y, and Z. Here, "and/or" includes any combination of one or more of the constituents.

Here, terms such as first, second, etc. may be used to describe various components, but these components are not limited to these terms. These terms are used only to distinguish one constituent element from another constituent element. Accordingly, the first component may be referred to as the second component within the scope of what is disclosed herein.

Spatially relative terms such as "below," "above," etc. may be used for descriptive purposes, thereby describing the relationship of one element or feature to another element(s) or feature(s) as shown in the drawings. Spatially relative terms are intended to include different directions in use, operation, and/or manufacture in addition to the directions depicted in the drawings. For example, if the device shown in the drawings is turned over, elements depicted as being located "below" other elements or features may be located "above" the other elements or features. Accordingly, in the present disclosure, the term "below" may include both above and below directions. Additionally, the device may be oriented in other directions (e.g., rotated by 90 degrees or in other orientations), and thus the spatially relative terms used herein should be interpreted accordingly.

Various embodiments are described with reference to drawings that schematize ideal embodiments. Accordingly, it will be expected that the shapes may vary depending, for example, on tolerances and/or manufacturing techniques. Accordingly, embodiments disclosed herein should not be construed as being limited to the specific shapes shown, and should be construed to include changes in shapes that occur, for example, as a result of manufacturing. As such, the shapes shown in the drawings may not depict the actual shapes of areas of the device, and the present embodiments are not limited thereto.

Figure 2:
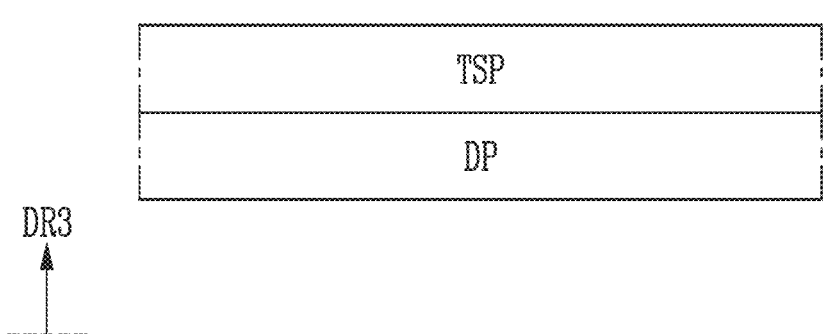

FIG. 1 and FIG. 2 are drawings for illustrating a display device according to some embodiments of the present invention.

Referring to FIGS. 1 and 2, the display device DD may include a display panel DP, an input sensor TSP, a display driver DDV, and a sensor driver SDV.

The display panel DP may include a display base layer DBSL and sub-pixels SPX located on the display base layer DBSL.

The display base layer DBSL may be a base substrate or base member for supporting the display device DD. The display base layer DBSL may be a rigid substrate made of glass. Alternatively, the display base layer DBSL may be a flexible substrate capable of bending, folding, rolling, etc. In this case, the display base layer DBSL may include an insulating material including a polymer resin such as polyimide (PI). However, the material of the display base layer DBSL is not limited thereto.

The display base layer DBSL may include a display area DA where images are displayed and a non-display area NDA, which is an area outside (e.g., in a periphery or outside a footprint of) the display area DA.

In the display area DA, scan lines SL and data lines DL and sub-pixels SPX connected to the scan lines SL and data lines DL may be located. The sub-pixels SPX may be configured to be selected by a scan signal at a turn-on level supplied from the scan lines SL, receive a data signal from the data lines DL, and emit light of a brightness corresponding to the data signal. Accordingly, an image corresponding to the data signal may be displayed in the display area DA.

Various lines and/or embedded circuits connected to sub-pixels SPX of the display area DA may be located in the non-display area NDA. For example, various lines may be located in the non-display area NDA to supply various power and control signals to the display area DA. According to some embodiments, some of these lines may be connected to the display driver DDV.

In this way, the display panel DP may be configured to output visual information (e.g., video, image, etc.). In the present invention, a type/kind of the display panel DP is not particularly limited. For example, the display panel DP may be implemented as a panel of a self-luminous type, such as an organic light emitting display panel. However, when the display panel DP is implemented as a self-luminous type, each sub-pixel is not necessarily limited to including an organic light emitting element. Each sub-pixel may include, for example, an organic light emitting diode, an inorganic light emitting diode, or a quantum dot/well light emitting diode. According to some embodiments, the display panel DP may be implemented as a display panel of a non-luminous type, such as a liquid crystal display panel. When the display panel DP is implemented as a non-luminous type, the display device DD may further include a light source such as a backlight unit.

Hereinafter, for convenience of description, embodiments in which the display panel DP is implemented as an organic light emitting display panel are described.

The input sensor TSP may be located on the display panel DP. The input sensor TSP may include a sensor base layer SBSL and a sensing electrode array SP located on the sensor base layer SBSL.

The sensor base layer SBSL may include a sensing area SA, which can sense touch inputs, etc., and a non-sensing area NSA, which is an area outside the sensing area SA. According to some embodiments, the sensing area SA may be arranged to overlap at least a portion of the display area DA. For example, the sensing area SA may substantially completely overlap the display area DA, and the non-sensing area NSA may at least partially overlap the non-display area NDA. In this case, when a touch input, etc. is provided on the display area DA, the touch input can be sensed through the input sensor TSP.

A sensing electrode array SP for sensing touch input, etc. may be located in the sensing area SA. The sensing electrode array SP may obtain information (e.g., position of the input, etc.) about input provided by the user. For example, the sensing electrode array SP may be implemented in any one of a variety of known methods, such as a capacitive sensing method, a mutual capacitance method, or a self-capacitance method, to obtain information about the input provided by the user.

According to some embodiments, the sensing electrode array SP may include a first sensing electrode array SP1 and a second sensing electrode array SP2. The first sensing electrode array SP1 may extend in the first direction DR1. A plurality of first sensing electrode arrays SP1 may be provided, and in this case, the first sensing electrode arrays SP1 may be arranged in a second direction DR2 intersecting the first direction DR1. The second sensing electrode array SP2 may extend in the second direction DR2. A plurality of second sensing electrode arrays SP2 may be provided, and in this case, the second sensing electrode arrays SP2 may be arranged in the first direction DR1. The first sensing electrode arrays SP1 and the second sensing electrode arrays SP2 may be insulated from each other and intersect each other.

The first sensing electrode array SP1 may include transmitter (Tx) electrodes, and the second sensing electrode array SP2 may include receiver (Rx) electrodes. However, according to some embodiments (e.g., self-capacitance method), the sensing electrode array SP may be configured as a single type without distinction between the first sensing electrode array SP1 and the second sensing electrode array SP2.

In the non-sensing area NSA, transmission lines for electrically connecting the sensing electrode array SP to the sensor driver SDV, etc., and sensing pads connected to the transmission lines may be located.

The display driver DDV may be configured to be electrically connected to the display panel DP and to drive the sub-pixels SPX. The sensor driver SDV may be configured to be electrically connected to the input sensor TSP and to drive the input sensor TSP.

Figure 3:
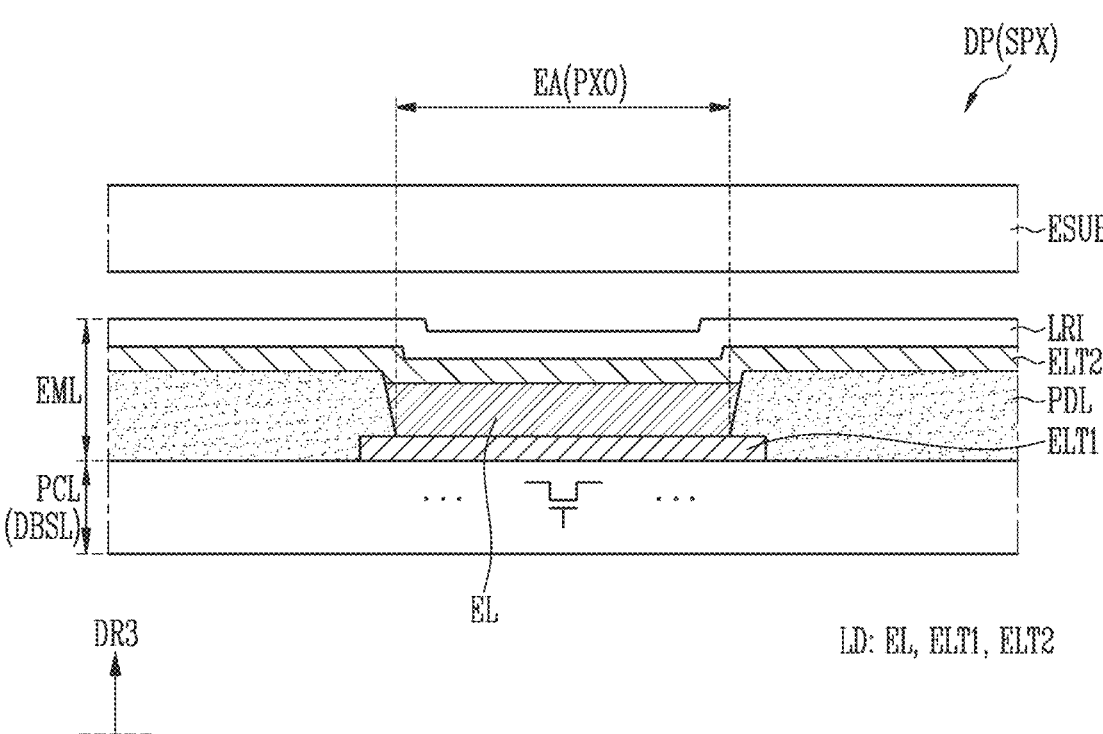
FIG. 3 is a cross-sectional view for illustrating a display panel of FIG. 2.

FIG. 3 is a cross-sectional view for illustrating a display panel of FIG. 2.

Referring to FIG. 3, a cross-sectional shape corresponding to one of the sub-pixels SPX described with reference to FIG. 1 is illustrated as an example. Sub-pixels SPX other than the sub-pixel SPX shown in FIG. 3 may also have a cross-sectional shape substantially the same (or similar) as the cross-sectional shape shown in FIG. 3.

The display panel DP may include a pixel circuit layer PCL, a light emitting element layer EML, and an encapsulation substrate ESUB.

The pixel circuit layer PCL may include a display base layer DBSL, conductive layers, one or more semiconductor layers, and insulating layers interposed between the conductive layers and the semiconductor layers, and a pixel circuit implemented by these components. The pixel circuit may include switching elements and driving transistors. The switching element may be implemented, for example, as a thin film transistor (TFT). The pixel circuit may be electrically connected to the light emitting element LD and may provide an electrical signal to the light emitting element LD to cause the light emitting element LD to generate light.

The light emitting element layer EML may be located on the pixel circuit layer PCL. According to some embodiments, the light emitting element layer EML may include a light emitting element LD, a pixel defining layer PDL, and a low-reflection inorganic layer LRI. The light emitting element LD may include a first electrode ELT1, a light emitting layer EL, and a second electrode ELT2.

The first electrode ELT1 may be located on the pixel circuit layer PCL. The first electrode ELT1 may be electrically connected to a switching element constituting the pixel circuit and may receive an electrical signal provided from the pixel circuit. According to some embodiments, the first electrode ELT1 may be referred to as an anode electrode. According to some embodiments, the first electrode ELT1 may include a light-reflective conductive material, whereby the light emission efficiency of light emitted from the light emitting layer EL may be relatively improved. However, the material of the first electrode ELT1 is not limited thereto.

The pixel defining layer PDL may be located on the pixel circuit layer PCL and the first electrode ELT1. The pixel defining layer PDL may include a pixel opening PXO that exposes at least a portion of the first electrode ELT1. The pixel defining layer PDL may include at least one material selected from the group consisting of acrylic resin, epoxy resin, phenol resin, polyamide resin, and polyimide resin. However, the material of the pixel defining layer PDL is not limited thereto. For example, the pixel defining layer PDL may include an inorganic material.

The light emitting layer EL may be located on the first electrode ELT1 within the pixel opening PXO of the pixel defining layer PDL. The light emitting layer EL may have a multilayer thin film structure including a light generation layer. According to some embodiments, the light emitting layer EL may include a hole injection layer, a hole transport layer, an organic light emitting layer, a hole suppression layer, an electron transport layer, and an electron injection layer sequentially stacked in the third direction DR3.

The second electrode ELT2 may be located on the pixel defining layer PDL and the light emitting layer EL. The second electrode ELT2 may receive a common voltage provided from an embedded circuit or a display driver DDV (see FIG. 1) located in the non-display area NDA (see FIG. 1). According to some embodiments, the second electrode ELT2 may be referred to as a cathode electrode. According to some embodiments, the second electrode ELT2 may include a substantially transparent or translucent conductive material to satisfy a light transmittance (e.g., a set or predetermined light transmittance or a light transmittance threshold).

The light emitting layer EL may generate and emit light based on electrical signals provided from the first electrode ELT1 and the second electrode ELT2. In this case, an area where light emitted from the light emitting layer EL is actually visible may be referred to as a light emitting area EA. For example, the light emitting area EA may be an area substantially the same as (or similar to) the area on which the pixel opening PXO is defined.

The low-reflection inorganic layer LRI may be located on the second electrode ELT2. The low-reflection inorganic layer LRI may absorb light incident from the outside into the display panel DP and may relatively reduce the external light reflectance of the display device DD. The low-reflection inorganic layer LRI may be composed of an inorganic material including one or more metals or metal compounds, taking into account the refractive index and light absorption coefficient. However, the materials for the low-reflection inorganic layer LRI are not limited thereto. According to some embodiments, the low-reflection inorganic layer LRI may be omitted.

The encapsulation substrate ESUB may be located on the light emitting element layer EML. A sealing member may be located between the encapsulation substrate ESUB and the light emitting element layer EML, and this sealing member may be provided to surround the display area DA of FIG. 1. A space between the encapsulation substrate ESUB and the light emitting element layer EML may be provided as a closed space by the sealing member. The encapsulation substrate ESUB and the sealing member may serve to protect components located under the encapsulation substrate ESUB from external impurities (e.g., moisture, gas, etc.). According to some embodiments, the upper surface of the encapsulation substrate ESUB may be substantially flat. Accordingly, the encapsulation substrate ESUB may serve to compensate for a step caused by the light emitting element LD and the pixel defining layer PDL for a component (e.g., the input sensor TSP of FIG. 4) located on the encapsulation substrate ESUB.

Figure 4:
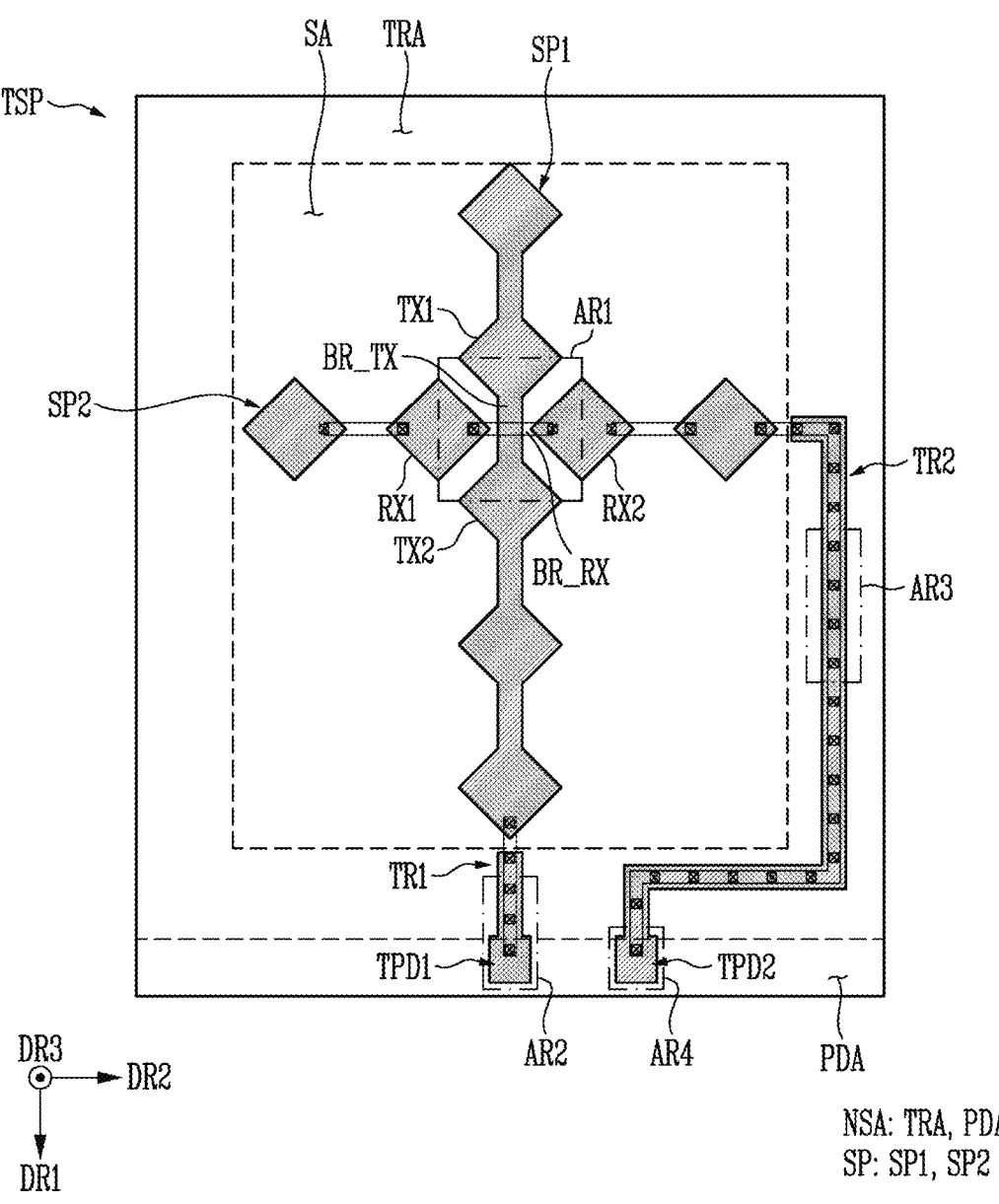
FIG. 4 is a plan view for illustrating an input sensor of FIG. 2.
Figure 5:
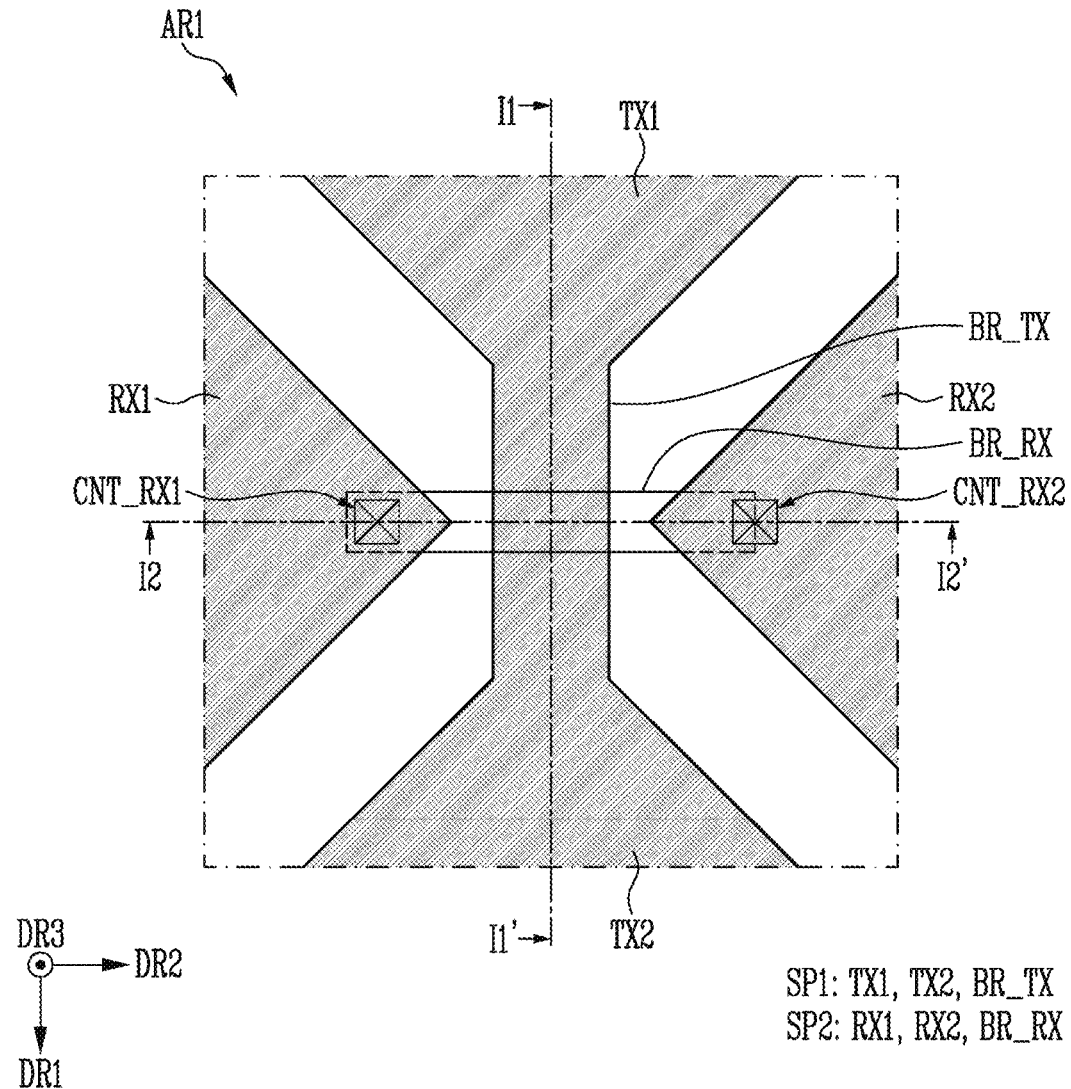
FIG. 5 is a plan view showing an enlarged view of an AR1 area of FIG. 4.
Figure 6:
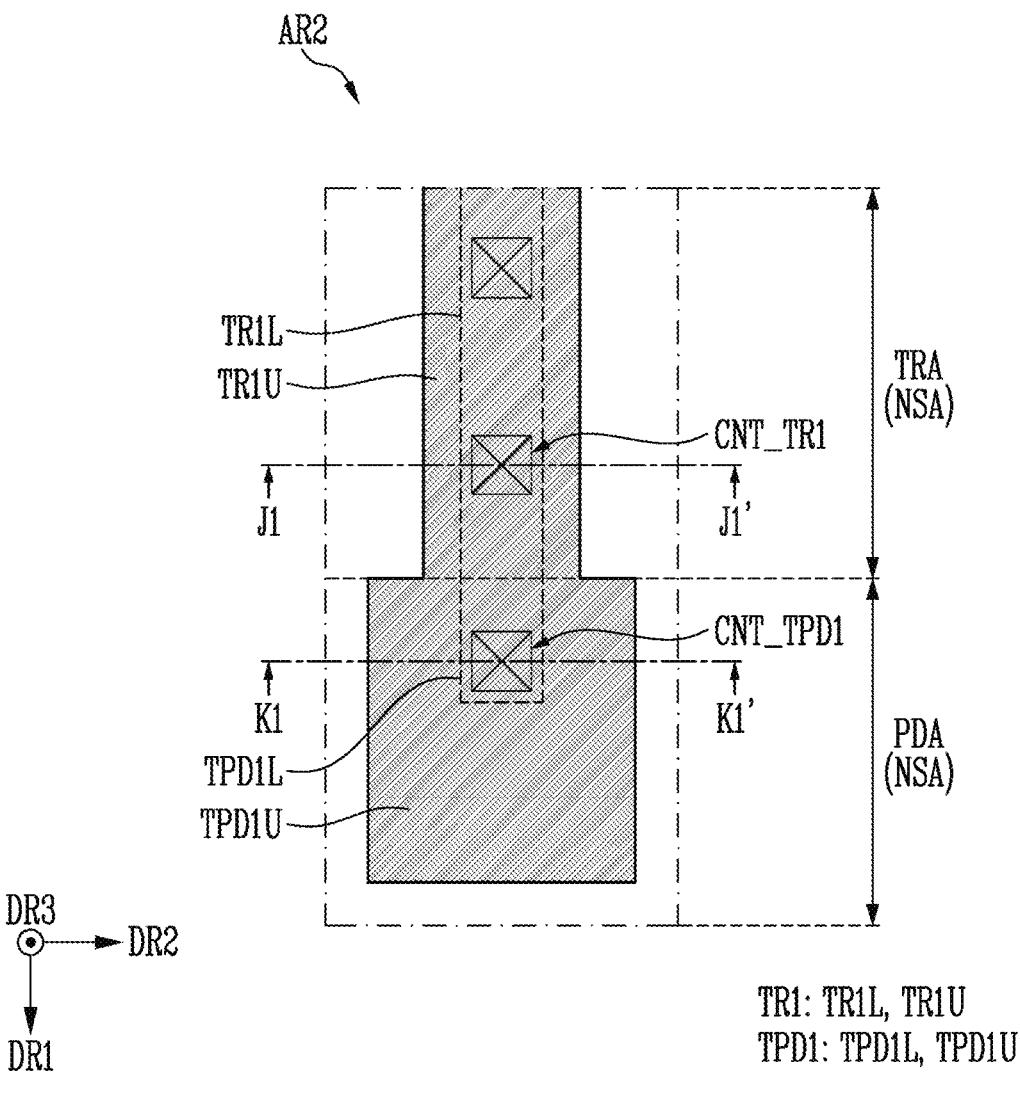
FIG. 6 is a plan view showing an enlarged view of an AR2 area of FIG. 4.
Figure 7:
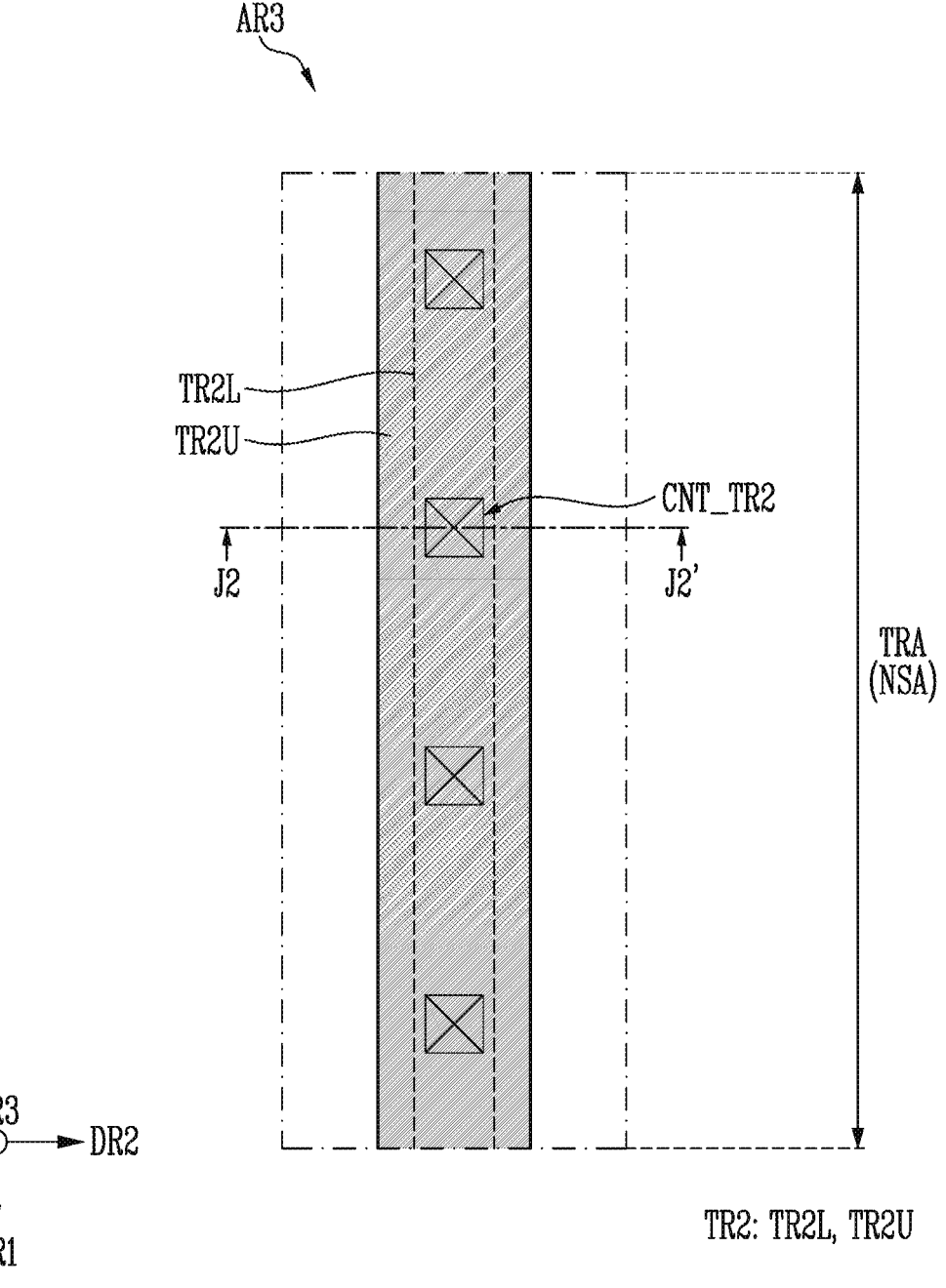
FIG. 7 is a plan view showing an enlarged view of an AR3 area of FIG. 4.
Figure 8:
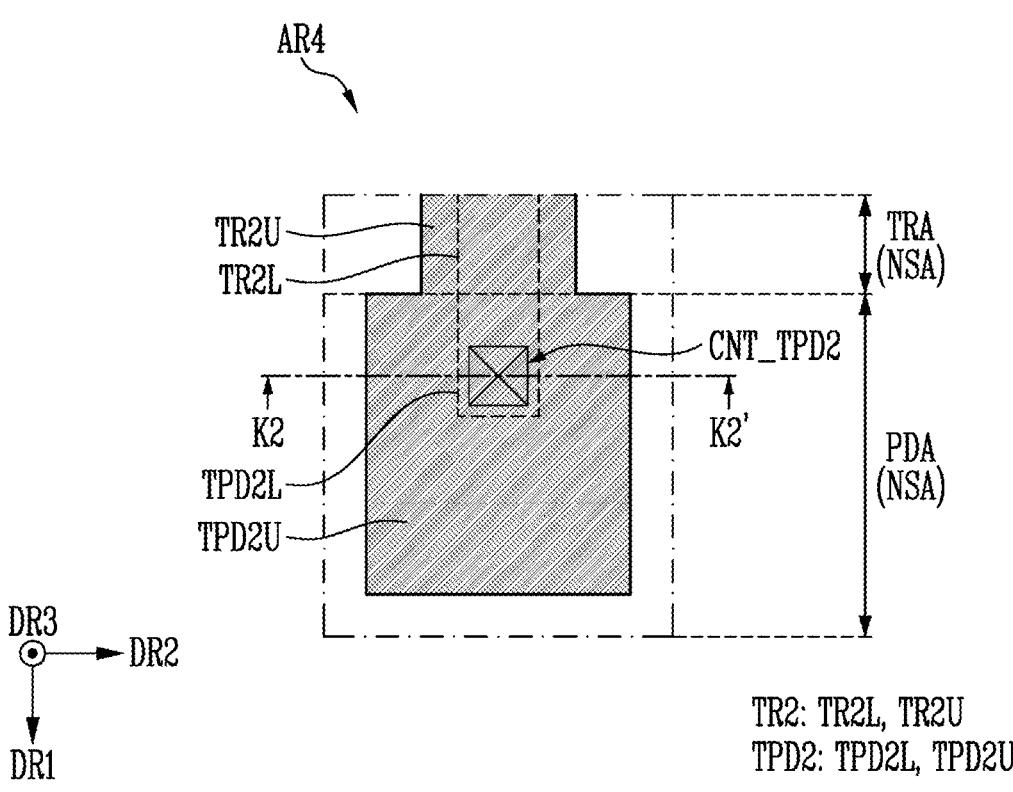
FIG. 8 is a plan view showing an enlarged view of an AR4 area of FIG. 4.

FIG. 4 is a plan view for illustrating an input sensor of FIG. 2. FIG. 5 is a plan view showing an enlarged view of an AR1 area of FIG. 4. FIG. 6 is a plan view showing an enlarged view of an AR2 area of FIG. 4. FIG. 7 is a plan view showing an enlarged view of an AR3 area of FIG. 4. FIG. 8 is a plan view showing an enlarged view of an AR4 area of FIG. 4.

Referring to FIG. 4, the input sensor TSP may include a sensing area SA and a non-sensing area NSA. The non-sensing area NSA may include a line area TRA around the sensing area SA and a pad area PDA around the line area TRA.

The input sensor TSP may include a sensing electrode array SP located in the sensing area SA. The sensing electrode array SP may include a first sensing electrode array SP1 and a second sensing electrode array SP2. The first sensing electrode array SP1 may extend in the first direction DR1. The second sensing electrode array SP2 may extend in the second direction DR2. In FIG. 4, for convenience of description, only one first sensing electrode array SP1 and one second sensing electrode array SP2 are shown, but a plurality of first sensing electrode arrays SP1 may be provided and a plurality of second sensing electrode arrays SP2 may be provided within the sensing area SA.

The input sensor TSP may include a first transmission line TR1 and a second transmission line TR2 located in the line area TRA. The first transmission line TR1 may be connected to the first sensing electrode array SP1. The second transmission line TR2 may be connected to the second sensing electrode array SP2. The first transmission line TR1 and the second transmission line TR2 may be spaced apart from each other.

According to some embodiments, when a plurality of first sensing electrode arrays SP1 are provided, a plurality of first transmission lines TR1 may be provided to correspond one-to-one to the first sensing electrode arrays SP1. Similarly, when a plurality of second sensing electrode arrays SP2 are provided, a plurality of second transmission lines TR2 may be provided to correspond one-to-one to the second sensing electrode arrays SP2.

The input sensor TSP may include a first sensing pad TPD1 and a second sensing pad TPD2 located in the pad area PDA. The first sensing pad TPD1 may be connected to the first transmission line TR1. The second sensing pad TPD2 may be connected to the second transmission line TR2. The first sensing pad TPD1 and the second sensing pad TPD2 may be spaced apart from each other.

According to some embodiments, when a plurality of first transmission lines TR1 are provided, a plurality of first sensing pads TPD1 may be provided to correspond one-to-one to the first transmission lines TR1. Similarly, when a plurality of second transmission lines TR2 are provided, a plurality of second sensing pads TPD2 may be provided to correspond one-to-one to the second transmission lines TR2.

Referring to FIGS. 4 and 5, the first sensing electrode array SP1 may include a 1-1 sensing electrode TX1, a 1-2 sensing electrode TX2, and a first bridge electrode BR_TX. The 1-1 sensing electrode TX1 and the 1-2 sensing electrode TX2 may be arranged in the first direction DR1. The first bridge electrode BR_TX may connect the 1-1 sensing electrode TX1 and the 1-2 sensing electrode TX2 to each other between the 1-1 sensing electrode TX1 and the 1-2 sensing electrode TX2.

The second sensing electrode array SP2 may include a 2-1 sensing electrode RX1, a 2-2 sensing electrode RX2, and a second bridge electrode BR_RX.

The 2-1 sensing electrode RX1 and the 2-2 sensing electrode RX2 may be arranged in the second direction DR2. The 2-1 sensing electrode RX1 and the 2-2 sensing electrode RX2 may be spaced apart from the first sensing electrode array SP1.

The second bridge electrode BR_RX may be located in a different layer from the 2-1 sensing electrode RX1, the 2-2 sensing electrode RX2, the 1-1 sensing electrode TX1, the 1-2 sensing electrode TX2, and the first bridge electrode BR_TX. The second bridge electrode BR_RX may be connected to the 2-1 sensing electrode RX1 through the 2-1 electrode contact hole CNT_RX1. The second bridge electrode BR_RX may be connected to the 2-2 sensing electrode RX2 through the 2-2 electrode contact hole CNT_RX2. The second bridge electrode BR_RX may be insulated from and intersect the first bridge electrode BR_TX.

Referring to FIGS. 4 and 6, the first transmission line TR1 may include a first lower transmission line TR1L and a first upper transmission line TR1U.

The first lower transmission line TR1L and the first upper transmission line TR1U may be located in different layers. The first lower transmission line TR1L may be located under the first upper transmission line TR1U. The first upper transmission line TR1U and the second lower transmission line TR1L may be connected to each other through the first line contact hole CNT_TR1. In this case, a plurality of first line contact holes CNT_TR1 formed to connect the first upper transmission line TR1U and the second lower transmission line TR1L may be provided. Accordingly, the resistance of the first transmission line TR1 including the first upper transmission line TR1U and the second lower transmission line TR1L may be relatively reduced.

The first sensing pad TPD1 may include a first lower sensing pad TPD1L and a first upper sensing pad TPD1U.

The first lower sensing pad TPD1L and the first upper sensing pad TPD1U may be located in different layers. The first lower sensing pad TPD1L may be located under the first upper sensing pad TPD1U. The first upper sensing pad TPD1U and the first lower sensing pad TPD1L may be connected to each other through the first pad contact hole CNT_TPD1.

Referring to FIGS. 4 and 7, the second transmission line TR2 may include a second lower transmission line TR2L and a second upper transmission line TR2U.

The second lower transmission line TR2L and the second upper transmission line TR2U may be located in different layers. The second lower transmission line TR2L may be located under the second upper transmission line TR2U. The second upper transmission line TR2U and the second lower transmission line TR2L may be connected to each other through the second line contact hole CNT_TR2. In this case, a plurality of second line contact holes CNT_TR2 formed to connect the second upper transmission line TR2U and the second lower transmission line TR2L may be provided. Accordingly, the resistance of the second transmission line TR2 including the second upper transmission line TR2U and the second lower transmission line TR2L may be relatively reduced.

Referring to FIGS. 4 and 8, the second sensing pad TPD2 may include a second lower sensing pad TPD2L and a second upper sensing pad TPD2U.

The second lower sensing pad TPD2L and the second upper sensing pad TPD2U may be located in different layers. The second lower sensing pad TPD2L may be located under the second upper sensing pad TPD2U. The second upper sensing pad TPD2U and the second lower sensing pad TPD2L may be connected to each other through a second pad contact hole CNT_TPD2.

Figure 9:
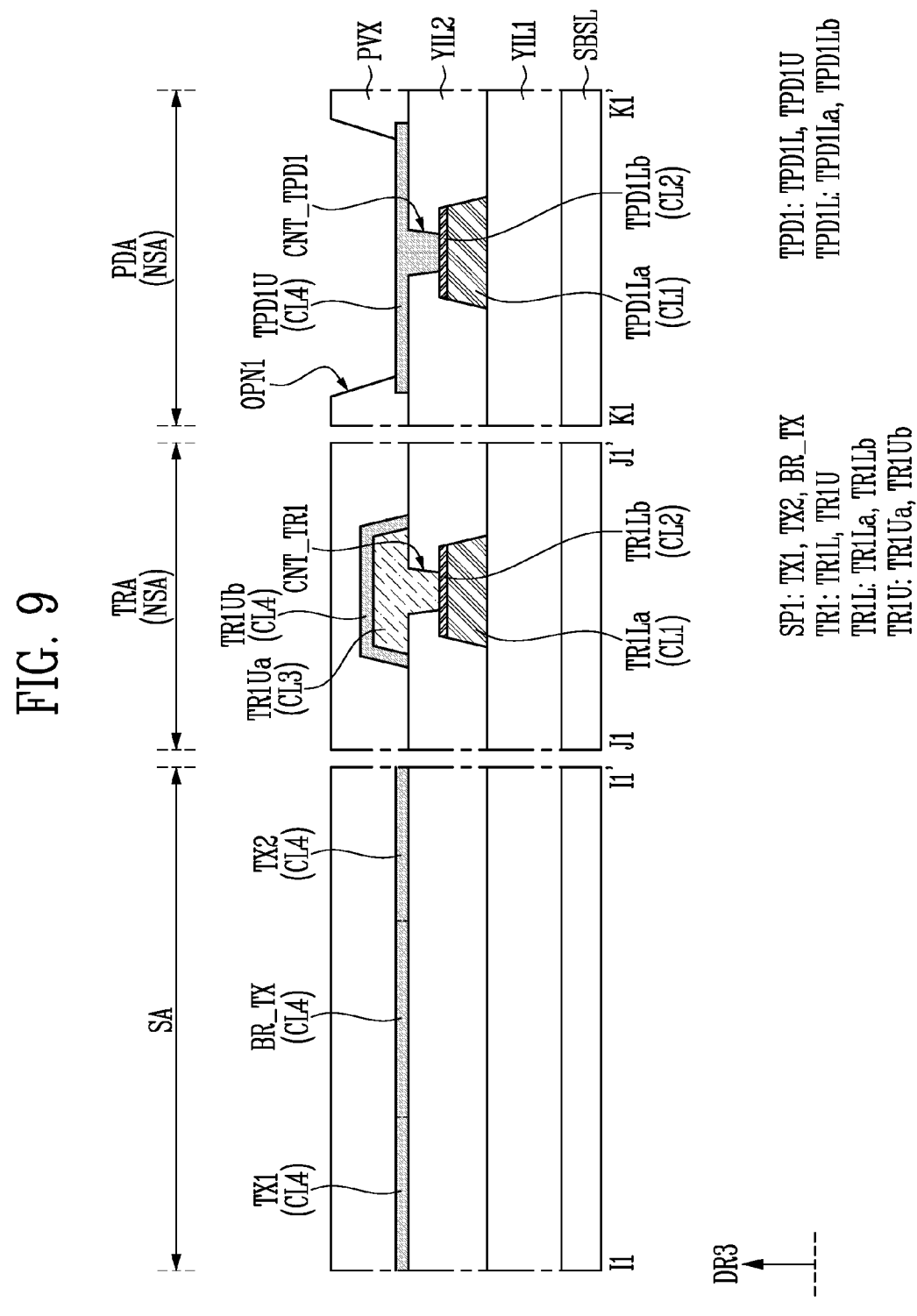
FIG. 9 is a cross-sectional view taken along a line I1-I1' of FIG. 5, a line J1-J1' of FIG. 6, and a line K1-K1' of FIG. 6.

FIG. 9 is a cross-sectional view taken along a line I1-I1' of FIG. 5, a line J1-J1' of FIG. 6, and a line K1-K1' of FIG. 6.

Referring to FIG. 9, the input sensor TSP may include a sensor base layer SBSL, and a first insulating layer YIL1, a first conductive layer CL1, a second conductive layer CL2, a second insulating layer YIL2, a third conductive layer CL3, a fourth conductive layer CL4, and a protective layer PVX sequentially stacked in the third direction DR3 (i.e., thickness direction) on the sensor base layer SBSL. The second insulating layer YIL2 may be referred to as a sensing insulating layer.

The sensor base layer SBSL may serve as a foundation for components located on the sensor base layer SBSL. According to some embodiments, the sensor base layer SBSL may be located on an encapsulation substrate ESUB as described with reference to FIG. 3.

The first insulating layer YIL1, the second insulating layer YIL2, and the protective layer PVX may include an inorganic insulating material and/or an organic insulating material. The inorganic insulating material may be, for example, at least one selected from the group consisting of silicon nitride, silicon oxide, silicon oxynitride, and aluminum oxide. The organic insulating material may be at least one selected from the group consisting of, for example, acrylic resin, epoxy resin, phenol resin, polyamide resin, and polyimide resin. However, the materials of the first insulating layer YIL1, the second insulating layer YIL2, and the protective layer PVX are not limited thereto.

According to some embodiments, the first conductive layer CL1 may be formed of one selected from the group consisting of molybdenum (Mo), titanium (Ti), and tantalum (Ta), or an alloy (e.g., MoNb) including the same.

According to some embodiments, each of the second conductive layer CL2 and the fourth conductive layer CL4 may be made of a conductive metal oxide. For example, the conductive metal oxide may be indium tin oxide (ITO). These conductive metal oxides may be materials that may maintain reliability against external impact, external impurities, and high temperatures.

According to some embodiments, the third conductive layer CL3 may be made of aluminum (Al) or an alloy including aluminum (Al), such as AlNd. Aluminum (Al) or alloys including aluminum (Al) may be materials with relatively low resistance, but may be vulnerable to relatively reduced reliability due to external impact, external impurities, and high temperatures.

The first sensing electrode array SP1, the first transmission line TR1, and the first sensing pad TP1 may be sensing components implemented by patterning the first conductive layer CL1, the second conductive layer CL2, the second insulating layer YIL2, the third conductive layer CL3, and the fourth conductive layer CL4.

According to some embodiments, the 1-1 sensing electrode TX1, the 1-2 sensing electrode TX2, and the first bridge electrode BR_TX may be implemented with the fourth conductive layer CL4. That is, the first sensing electrode array SP1 may be implemented with the fourth conductive layer CL4, and in this case, it may be understood that the number of conductive layers constituting the first sensing electrode array SP1 is one.

According to some embodiments, the 1-1 sensing electrode TX1, the 1-2 sensing electrode TX2, and the first bridge electrode BR_TX may be directly located on the second insulating layer YIL2.

According to some embodiments, the first lower transmission line TR1L may have a double-layer structure including a 1-1 lower transmission line layer TR1La implemented with the first conductive layer CL1, and a 1-2 lower transmission line layer TR1Lb implemented with the second conductive layer CL2. The first upper transmission line TR1U may have a double-layer structure including a 1-1 upper transmission line layer TR1Ua implemented with the third conductive layer CL3, and a 1-2 upper transmission line layer TR1Ub implemented with the fourth conductive layer CL4. In this case, it may be understood that the number of conductive layers constituting the first transmission line TR1 is four.

According to some embodiments, the 1-1 upper transmission line layer TR1Ua may be connected to the 1-2 lower transmission line layer TR1Lb through a first line contact hole CNT_TR1 formed in the second insulating layer YIL2. In this case, the first line contact hole CNT_TR1 may be formed to expose a portion of the upper surface of the 1-2 lower transmission line layer TR1Lb, and the 1-2 lower transmission line layer TR1Lb may be interposed between the 1-1 upper transmission line layer TR1Ua and the 1-1 lower transmission line layer TR1La.

According to some embodiments, the 1-2 lower transmission line layer TR1Lb may cover an upper surface of the 1-1 lower transmission line layer TR1La and may expose side surfaces of the 1-1 lower transmission line layer TR1La. The exposed side surfaces of the 1-1 lower transmission line layer TR1La may be in contact with the second insulating layer YIL2.

In this way, the 1-2 lower transmission line layer TR1Lb implemented with the second conductive layer CL2, which is a material capable of maintaining reliability against external impact, external impurities, and high temperatures, covers the upper surface of the 1-1 lower transmission line layer TR1La, thereby relatively improving the reliability of the first lower transmission line TR1L.

According to some embodiments, the 1-2 upper transmission line layer TR1Ub may cover the upper surface and side surfaces of the 1-1 upper transmission line layer TR1Ua. In this case, the 1-2 upper transmission line layer TR1Ub may be interposed between the 1-1 upper transmission line layer TR1Ua and the protective layer PVX, and the 1-1 upper transmission line layer TR1Ua and the protective layer PVX may not be in direct contact with each other.

In this way, the 1-2 upper transmission line layer TR1Ub implemented with the fourth conductive layer CL4, which is a material capable of maintaining reliability against external impact, external impurities, and high temperatures, covers the upper surface and side surfaces of the first upper transmission line layer TR1Ua, thereby relatively improving the reliability of the first upper transmission line layer TR1U. In addition, the 1-1 upper transmission line layer TR1Ua is implemented with the third conductive layer CL3, which is a material having relatively low resistance, thereby relatively improving the signal transmission efficiency of the 1-1 upper transmission line TR1U.

According to some embodiments, the first lower sensing pad TPD1L may have a double-layer structure including a 1-1 lower sensing pad layer TPD1La implemented with the first conductive layer CL1, and a 1-2 lower sensing pad layer TPD1Lb implemented with the second conductive layer CL2. The first upper sensing pad TPD1U may be implemented with the fourth conductive layer CL4. In this case, it may be understood that the number of conductive layers constituting the first sensing pad TPD1 is three.

According to some embodiments, the first upper sensing pad TPD1U may be connected to the 1-2 lower sensing pad layer TPD1Lb through the first pad contact hole CNT_TPD1 formed in the second insulating layer YIL2. In this case, the first pad contact hole CNT_TPD1 may be formed to expose a portion of the upper surface of the 1-2 lower sensing pad layer TPD1Lb, and the 1-2 lower sensing pad layer TPD1Lb may be interposed between the first upper sensing pad TPD1U and the 1-1 lower sensing pad layer TPD1La.

According to some embodiments, the 1-2 lower sensing pad layer TPD1Lb may cover the upper surface of the 1-1 lower sensing pad layer TPD1La and may expose side surfaces of the 1-1 lower sensing pad layer TPD1La. The exposed side surfaces of the 1-1 lower sensing pad layer TPD1La may be in contact with the second insulating layer YIL2.

According to some embodiments, the protective layer PVX may include a first pad opening OPN1 exposing at least a portion of the first upper sensing pad TPD1U. Through the first pad opening OPN1, the sensor driver SDV (or line connected to the sensor driver SDV) described with reference to FIG. 1 may be connected to the first upper sensing pad TPD1U.

Figure 10:
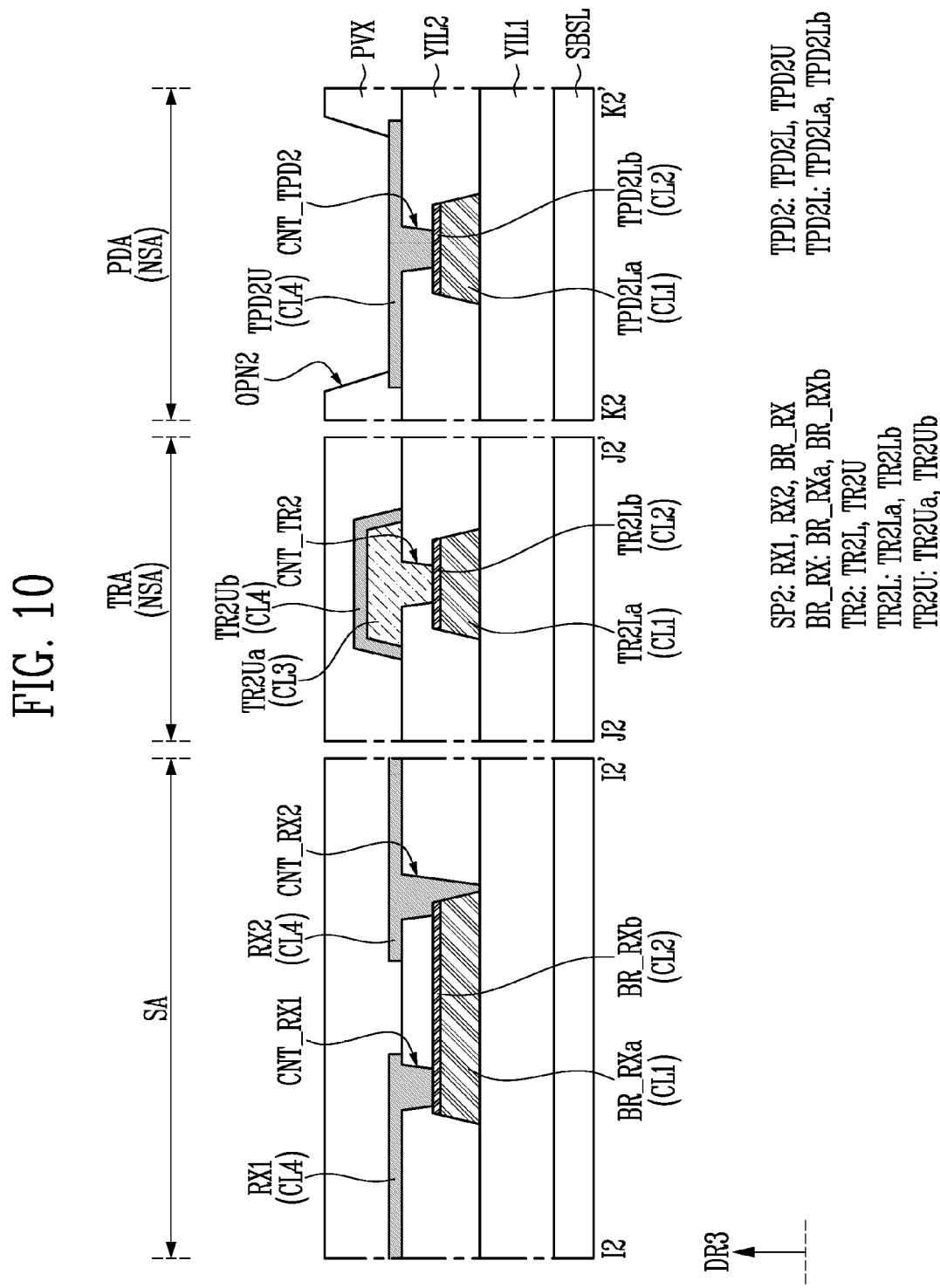
FIG. 10 is a cross-sectional view taken along a line I2-I2' of FIG. 5, a line J2-J2' of FIG. 7, and a line K2-K2' of FIG. 8.

FIG. 10 is a cross-sectional view taken along a line I2-I2' of FIG. 5, a line J2-J2' of FIG. 7, and a line K2-K2' of FIG. 8.

Referring to FIG. 10, the second sensing electrode array SP2, the second transmission line TR2, and the second sensing pad TPD2 may be sensing components implemented by patterning the first conductive layer CL1, the second conductive layer CL2, the second insulating layer YIL2, the third conductive layer CL3, and the fourth conductive layer CL4.

According to some embodiments, the 2-1 sensing electrode RX1 and the 2-2 sensing electrode RX2 may be implemented with the fourth conductive layer CL4. The second bridge electrode BR_RX may include a 2-1 bridge electrode layer BR_RXa implemented with the first conductive layer CL1, and a 2-2 bridge electrode layer BR_RXb implemented with the second conductive layer CL2. In this case, it may be understood that the number of conductive layers constituting the second sensing electrode array SP2 is three.

According to some embodiments, the 2-1 sensing electrode RX1 and the 2-2 sensing electrode RX2 may be directly located on the second insulating layer YIL2.

According to some embodiments, the 2-2 bridge electrode layer BR_RXb may cover the upper surface of the 2-1 bridge electrode layer BR_RXa and may expose side surfaces of the 2-1 bridge electrode layer BR_RXa. A portion of the exposed side surfaces of the 2-1 bridge electrode layer BR_RXa may be in direct contact with the second insulating layer YIL2.

According to some embodiments, the 2-1 sensing electrode RX1 may be connected to the 2-2 bridge electrode layer BR_RXb through the 2-1 electrode contact hole CNT_RX1 formed in the second insulating layer YIL2. In this case, the 2-1 electrode contact hole CNT_RX1 may be formed to expose a portion of the upper surface of the 2-2 bridge electrode layer BR_RXb, and the 2-2 bridge electrode layer BR_RXb may be interposed between the 2-1 sensing electrode RX1 and the 2-1 bridge electrode layer BR_RXa.

According to some embodiments, the 2-2 sensing electrode RX2 may be connected to the 2-1 bridge electrode layer BR_RXa and the 2-2 bridge electrode layer BR_RXb through a 2-2 electrode contact hole CNT_RX2 formed in the second insulating layer YIL2. In this case, as shown in FIG. 10, the 2-2 electrode contact hole CNT_RX2 may be formed to expose the upper surface of the 2-2 bridge electrode layer BR_RXb, the side surface of the 2-2 bridge electrode layer BR_RXb, and the side surface of the 2-1 bridge electrode layer BR_RXa. Accordingly, the 2-2 sensing electrode RX2 may be in direct contact with each of the 2-1 bridge electrode layer BR_RXa and the 2-2 bridge electrode layer BR_RXb.

In this way, because the 2-1 electrode contact hole CNT_RX1 and the 2-2 electrode contact hole CNT_RX2 are formed of different types, the visibility of reflected light by the fourth conductive layer CL4 configured to fill the 2-1 electrode contact hole CNT_RX1 and the 2-2 electrode contact hole CNT_RX2 may be relatively reduced. Therefore, the visibility of the display device DD may be relatively improved.

According to some embodiments, the second lower transmission line TR2L may have a double-layer structure including a 2-1 lower transmission line layer TR2La implemented with the first conductive layer CL1, and a 2-2 lower transmission line layer TR2Lb implemented with the second conductive layer CL2. The second upper transmission line TR2U may have a double-layer structure including a 2-1 upper transmission line layer TR2Ua implemented with the third conductive layer CL3, and a 2-2 upper transmission line layer TR2Ub implemented with the fourth conductive layer CL4. In this case, it may be understood that the number of conductive layers constituting the second transmission line TR2 is four.

According to some embodiments, the 2-1 upper transmission line layer TR2Ua may be connected to the 2-2 lower transmission line layer TR2Lb through the second line contact hole CNT_TR2 formed in the second insulating layer YIL2. In this case, the second line contact hole CNT_TR2 may be formed to expose a portion of the upper surface of the 2-2 lower transmission line layer TR2Lb, and the 2-2 lower transmission line layer TR2Lb may be interposed between the 2-1 upper transmission line layer TR2Ua and the 2-1 lower transmission line layer TR2La.

According to some embodiments, the 2-2 lower transmission line layer TR2Lb may cover an upper surface of the 2-1 lower transmission line layer TR2La and may expose side surfaces of the 2-1 lower transmission line layer TR2La. The exposed side surfaces of the 2-1 lower transmission line layer TR2La may be in contact with the second insulating layer YIL2.

In this way, the 2-2 lower transmission line layer TR2Lb implemented with the second conductive layer CL2, which is a material capable of maintaining reliability against external impact, external impurities, and high temperatures, covers the upper surface of the 2-1 lower transmission line layer TR2La, thereby relatively improving the reliability of the second lower transmission line TR2L.

According to some embodiments, the 2-2 upper transmission line layer TR2Ub may cover the upper surface and side surfaces of the 2-1 upper transmission line layer TR2Ua. In this case, the 2-2 upper transmission line layer TR2Ub may be interposed between the 2-1 upper transmission line layer TR2Ua and the protective layer PVX, and the 2-1 upper transmission line layer TR2Ua and the protective layer PVX may not be in direct contact with each other.

In this way, the 2-2 upper transmission line layer TR2Ub implemented with the fourth conductive layer CL4, which is a material capable of maintaining reliability against external impact, external impurities, and high temperatures, covers the upper surface and side surfaces of the 2-1 upper transmission line layer TR2Ua, thereby relatively improving the reliability of the second upper transmission line TR2U. In addition, the 2-1 upper transmission line layer TR2Ua may be implemented with the third conductive layer CL3 which is a material having relatively low resistance, thereby relatively improving the signal transmission efficiency of the 2-1 upper transmission line TR2U.

According to some embodiments, the second lower sensing pad TPD2L may have a double-layer structure including a 2-1 lower sensing pad layer TPD2La implemented with the first conductive layer CL1, and a 2-2 lower sensing pad layer TPD2Lb implemented with the second conductive layer CL2. The second upper sensing pad TPD2U may be implemented with the fourth conductive layer CL4. In this case, it may be understood that the number of conductive layers constituting the second sensing pad TPD2 is three.

According to some embodiments, the second upper sensing pad TPD2U may be connected to the 2-2 lower sensing pad layer TPD2Lb through the second pad contact hole CNT_TPD2 formed in the second insulating layer YIL2. In this case, the second pad contact hole CNT_TPD2 may be formed to expose a portion of the upper surface of the 2-2 lower sensing pad layer TPD2Lb, and the 2-2 lower sensing pad layer TPD2Lb may be interposed between the second upper sensing pad TPD2U and the 2-1 lower sensing pad layer TPD2La.

According to some embodiments, the 2-2 lower sensing pad layer TPD2Lb may cover an upper surface of the 2-1 lower sensing pad layer TPD2La and may expose side surfaces of the 2-1 lower sensing pad layer TPD2La. The exposed side surfaces of the 2-1 lower sensing pad layer TPD2La may be in contact with the second insulating layer YIL2.

According to some embodiments, the protective layer PVX may include a second pad opening OPN2 exposing at least a portion of the second upper sensing pad TPD2U. Through the second pad opening OPN2, the sensor driver SDV (or the line connected to the sensor driver SDV) described with reference to FIG. 1 may be connected to the second upper sensing pad TPD2U.

FIGS. 11 to 31 are drawings for illustrating a manufacturing method of a display device according to some embodiments of the present invention. Although FIGS. 11-31 illustrate various operations in a manufacturing method of a display device, embodiments according to the present disclosure are not limited thereto, and according to various embodiments, the method may include additional operations, or fewer operations, or the order of operations may vary, unless otherwise stated or implied, without departing from the spirit and scope of embodiments according to the present disclosure.

Hereinafter, in illustrating the manufacturing method of the display device, descriptions of contents overlapping with those described with reference to FIGS. 1 to 10 may be omitted.

Figure 11:
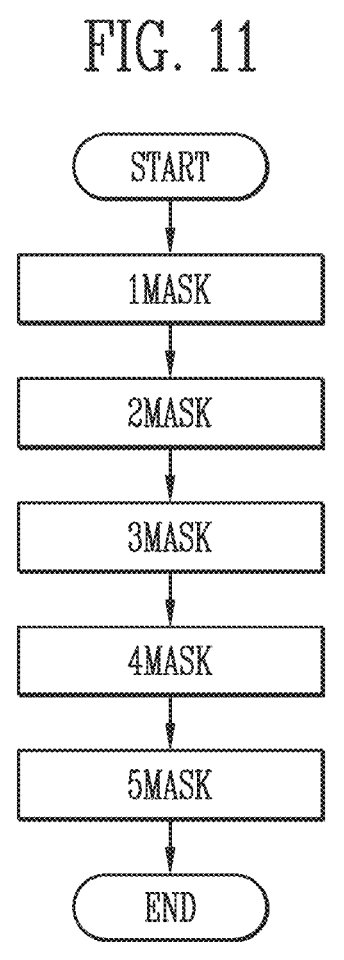

Referring to FIG. 11, the first to fifth mask processes (1MASK, 2MASK, 3MASK, 4MASK, 5MASK) may be performed.

FIGS. 12 to 15 are drawings for illustrating the first mask process (1MASK).

Figure 12:
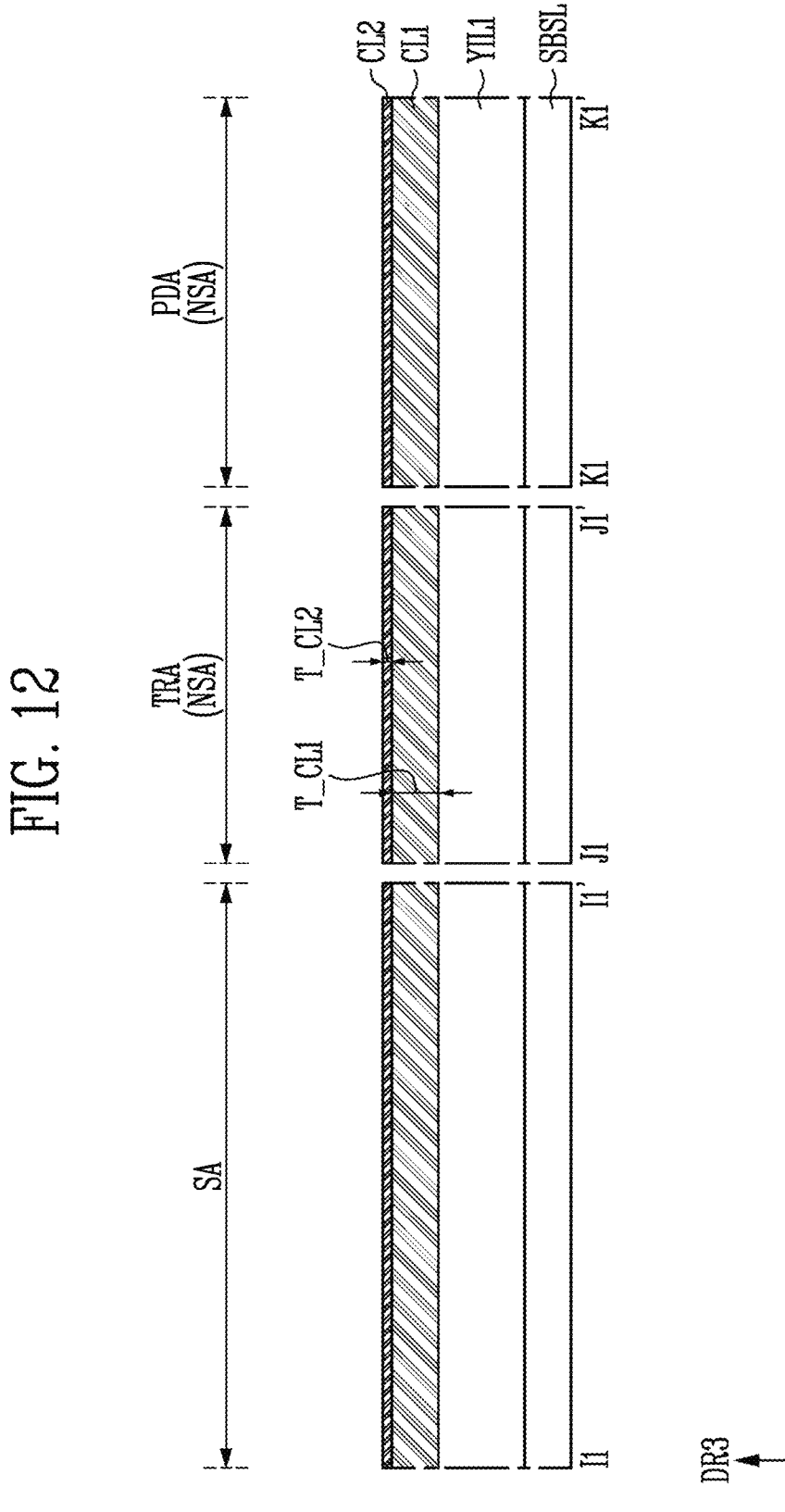
Figure 13:
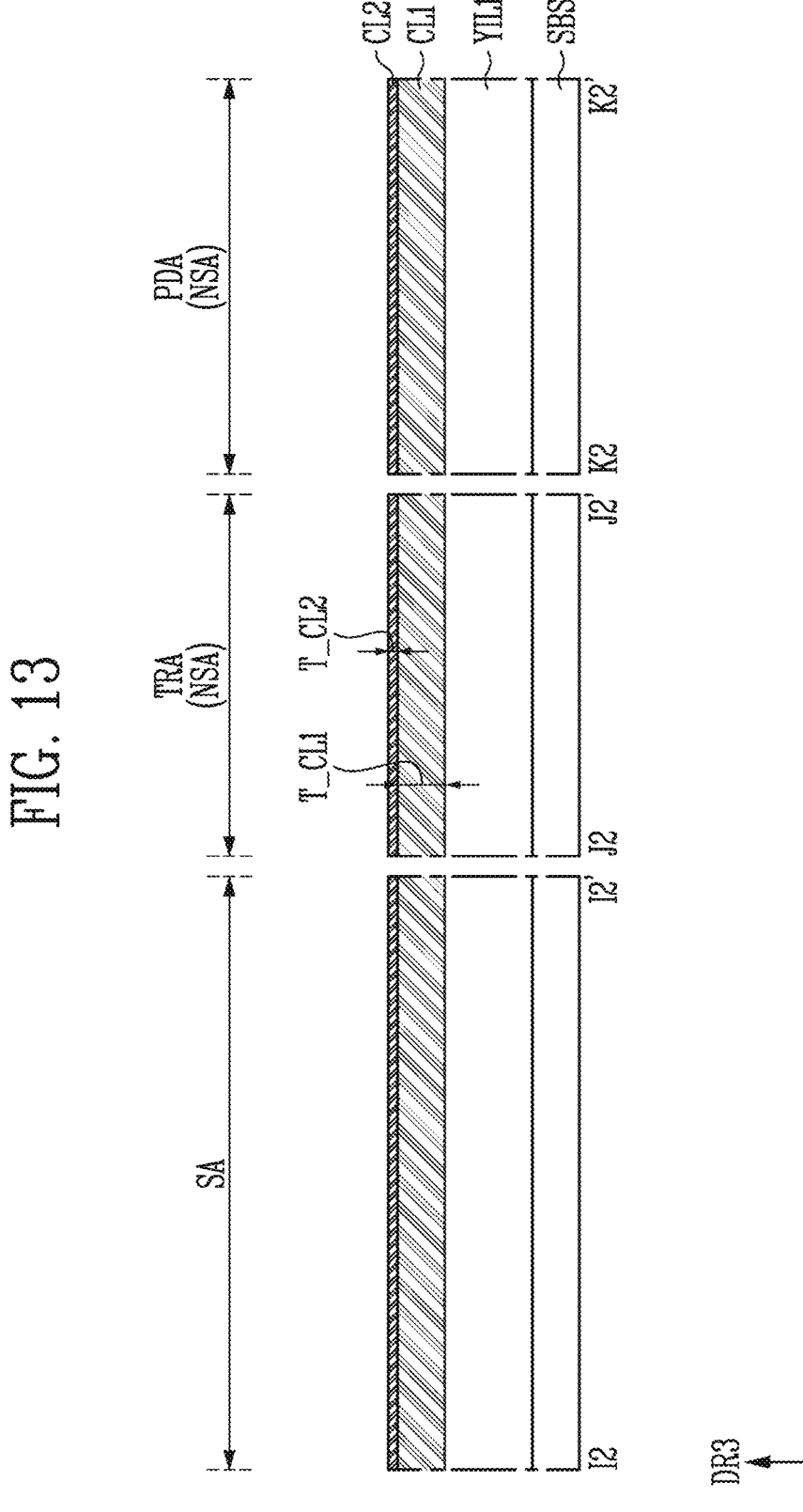

Referring to FIGS. 12 and 13, a first insulating layer YIL1 may be formed on a sensor base layer SBSL. The first insulating layer YIL1 may be formed entirely in the sensing area SA and the non-sensing area NSA. The first insulating layer YIL1 may be formed directly on the sensor base layer SBSL.

Thereinafter, a first conductive layer CL1 may be formed on the first insulating layer YIL1. The first conductive layer CL1 may be formed entirely in the sensing area SA and the non-sensing area NSA.

Thereinafter, a second conductive layer CL2 may be formed on the first conductive layer CL1. The second conductive layer CL2 may be formed entirely in the sensing area SA and the non-sensing area NSA.

According to some embodiments, the thickness T_CL1 of the first conductive layer CL1 in the third direction DR3 may be larger than the thickness T_CL2 of the second conductive layer CL2 in the third direction DR3. For example, the thickness T_CL1 of the first conductive layer CL1 may be about 8 times or more and about 12 times or less than the thickness T_CL2 of the second conductive layer CL2. However, the thickness T_CL1 of the first conductive layer CL1 and the thickness T_CL2 of the second conductive layer CL2 are not limited thereto.

Figure 15:
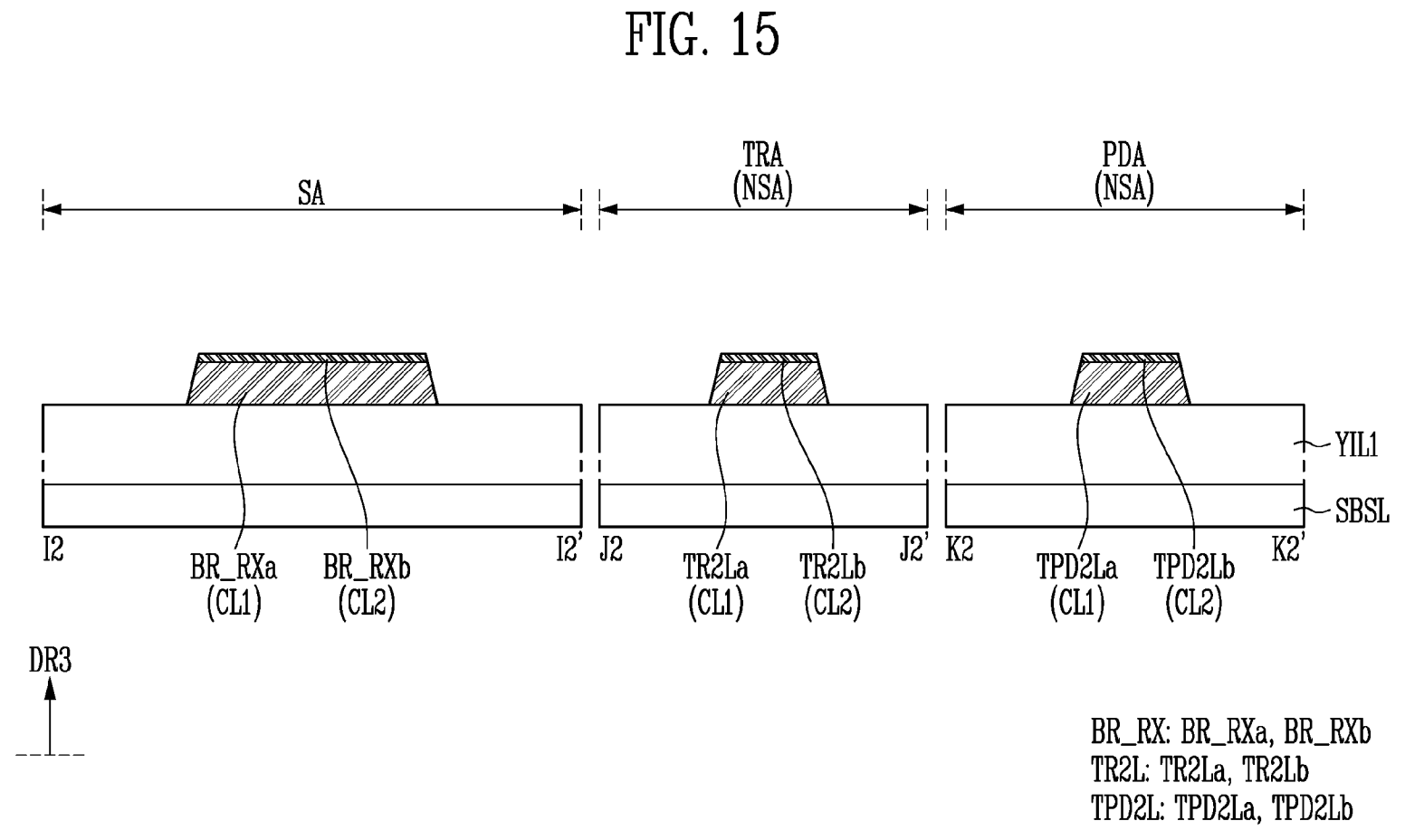

Referring to FIGS. 14 and 15, the first conductive layer CL1 and the second conductive layer CL2 may be patterned to form a second bridge electrode BR_RX, a first lower transmission line TR1L, a second lower transmission line TR2L, a first lower sensing pad TPD1L, and a second lower sensing pad TPD2L.

Patterning of the first conductive layer CL1 and the second conductive layer CL2 may be performed by a patterning process using a first mask. With this patterning process, various known patterning processes may be applied without limitation.

FIGS. 16 to 19 are drawings for illustrating the second mask process (2MASK).

Figure 16:
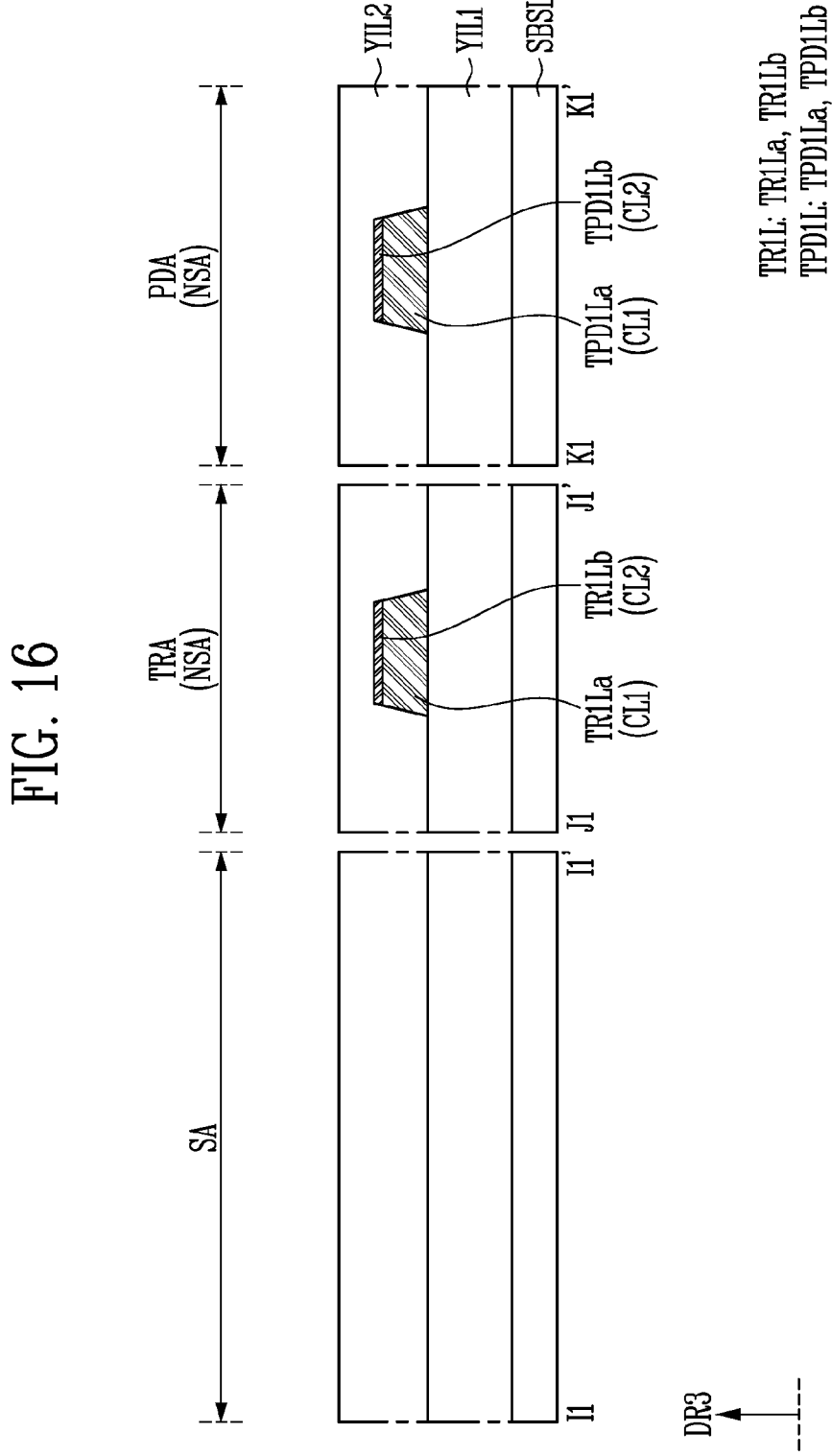
Figure 17:
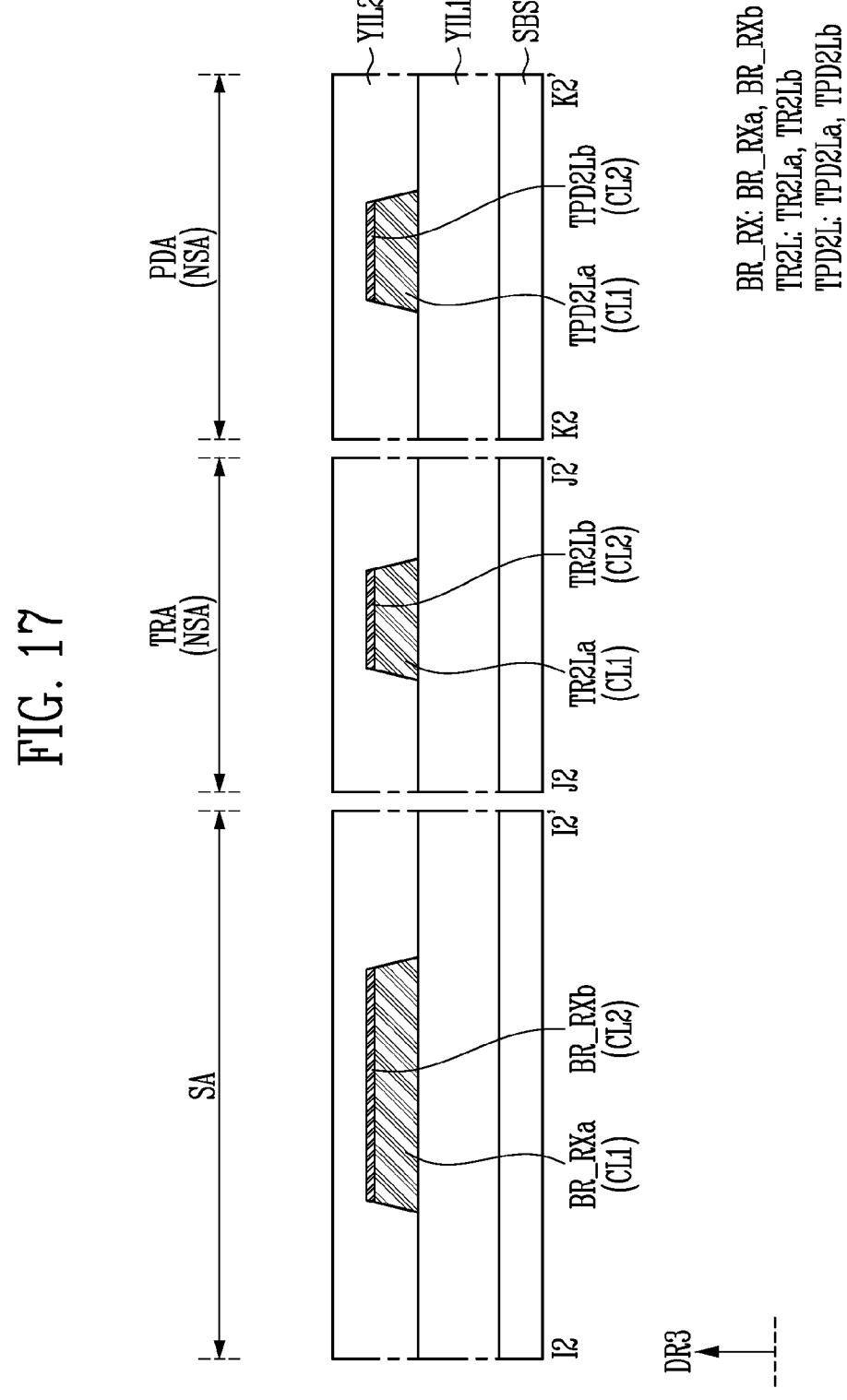

Referring to FIGS. 16 and 17, a second insulating layer YIL2 may be formed on the first insulating layer YIL1, the second bridge electrode BR_RX, the first lower transmission line TR1L, the second lower transmission line TR2L, the first lower sensing pad TPD1L, and the second lower sensing pad TPD2L. The second insulating layer YIL2 may be formed entirely in the sensing area SA and the non-sensing area NSA.

Figure 18:
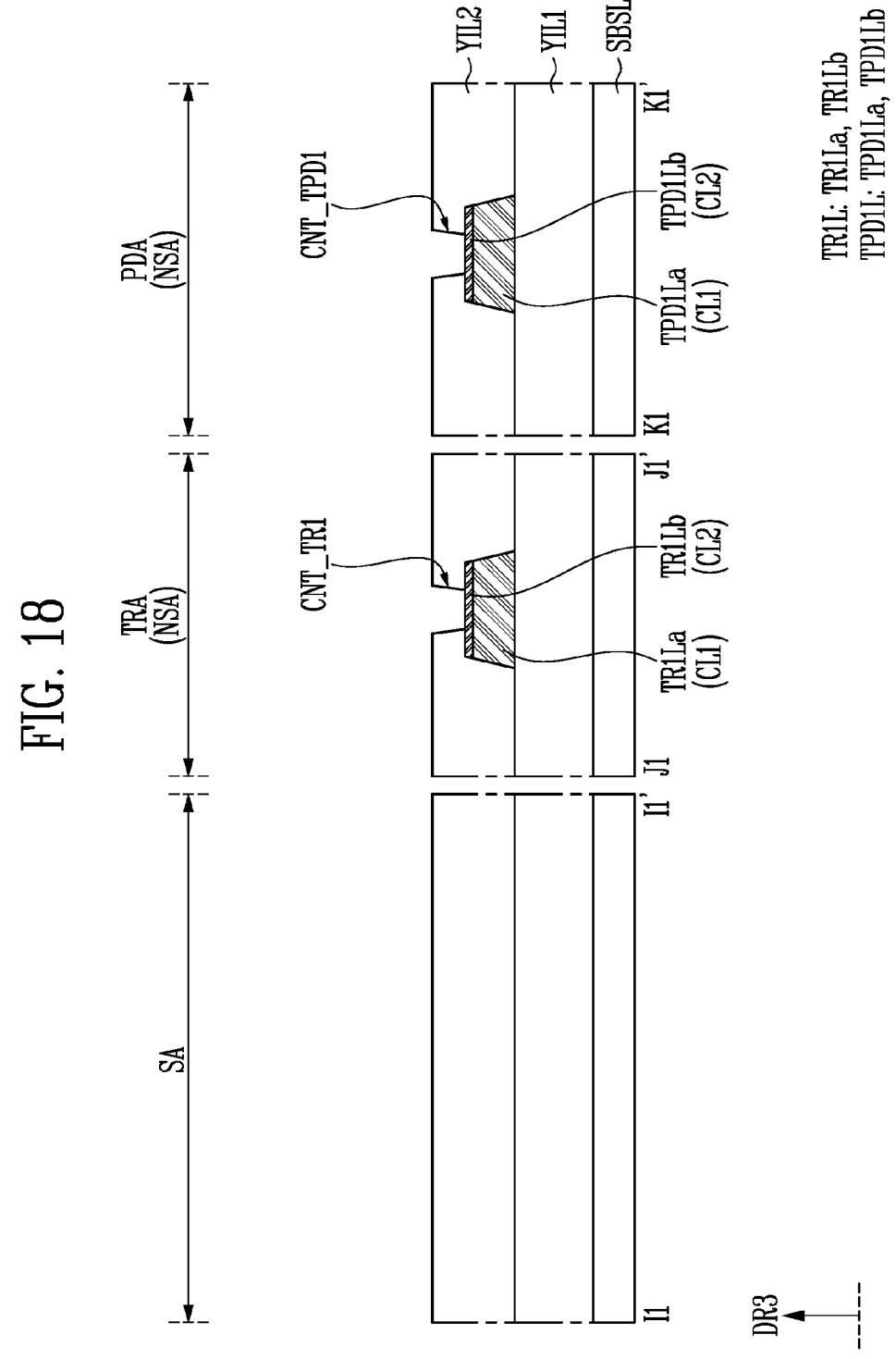
Figure 19:
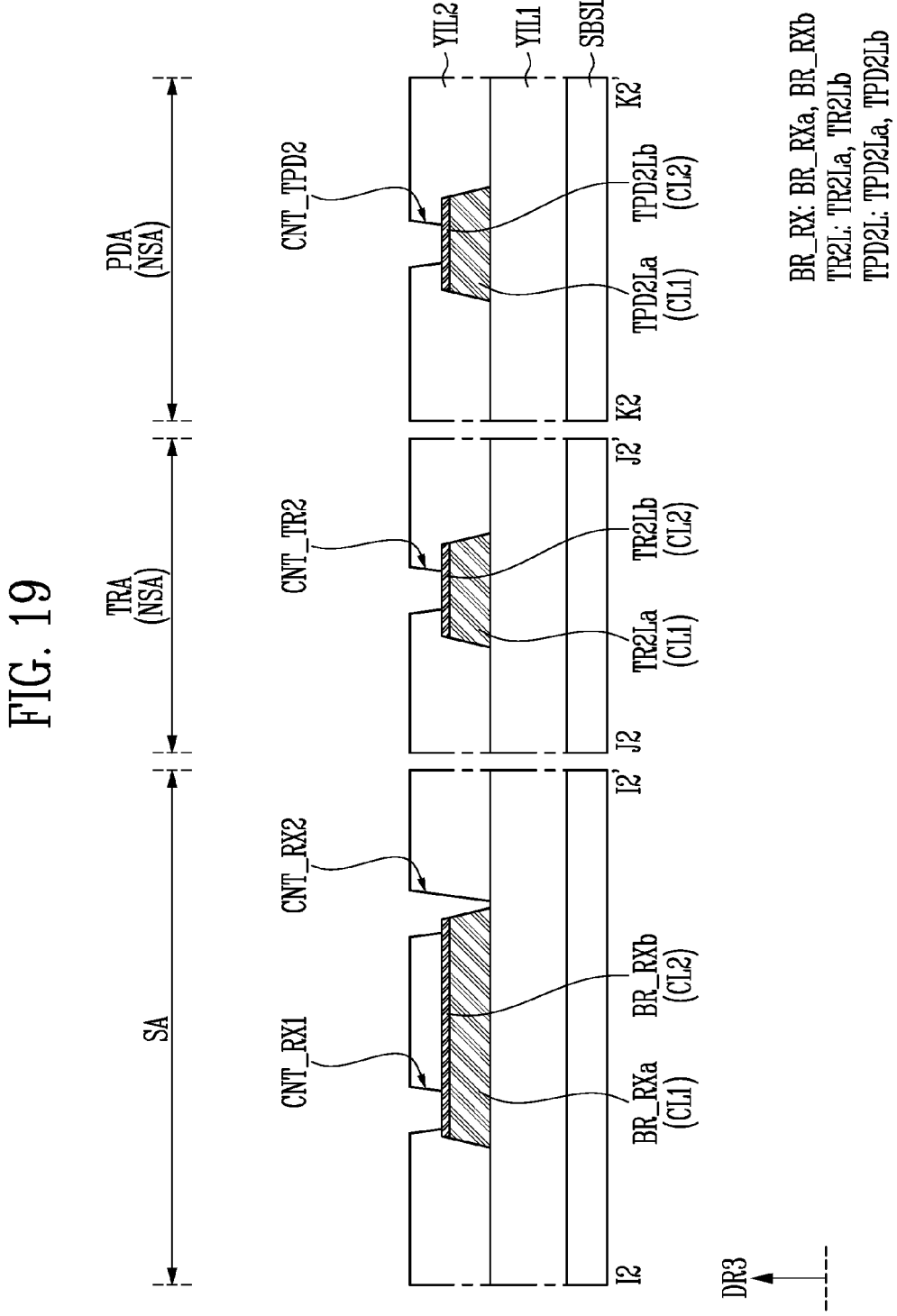

Referring to FIGS. 18 and 19, the second insulating layer YIL2 may be patterned to form a 2-1 electrode contact hole CNT_RX1, a 2-2 electrode contact hole CNT_RX2, a first line contact hole CNT_TR1, a second line contact hole CNT_TR2, a first pad contact hole CNT_TPD1, and a second pad contact hole CNT_TPD2.

Patterning of the second insulating layer YIL2 may be performed by a patterning process using a second mask. With this patterning process, various known patterning processes may be applied without limitation.

FIGS. 20 to 23 are drawings for illustrating the third mask process (3MASK).

Figure 20:
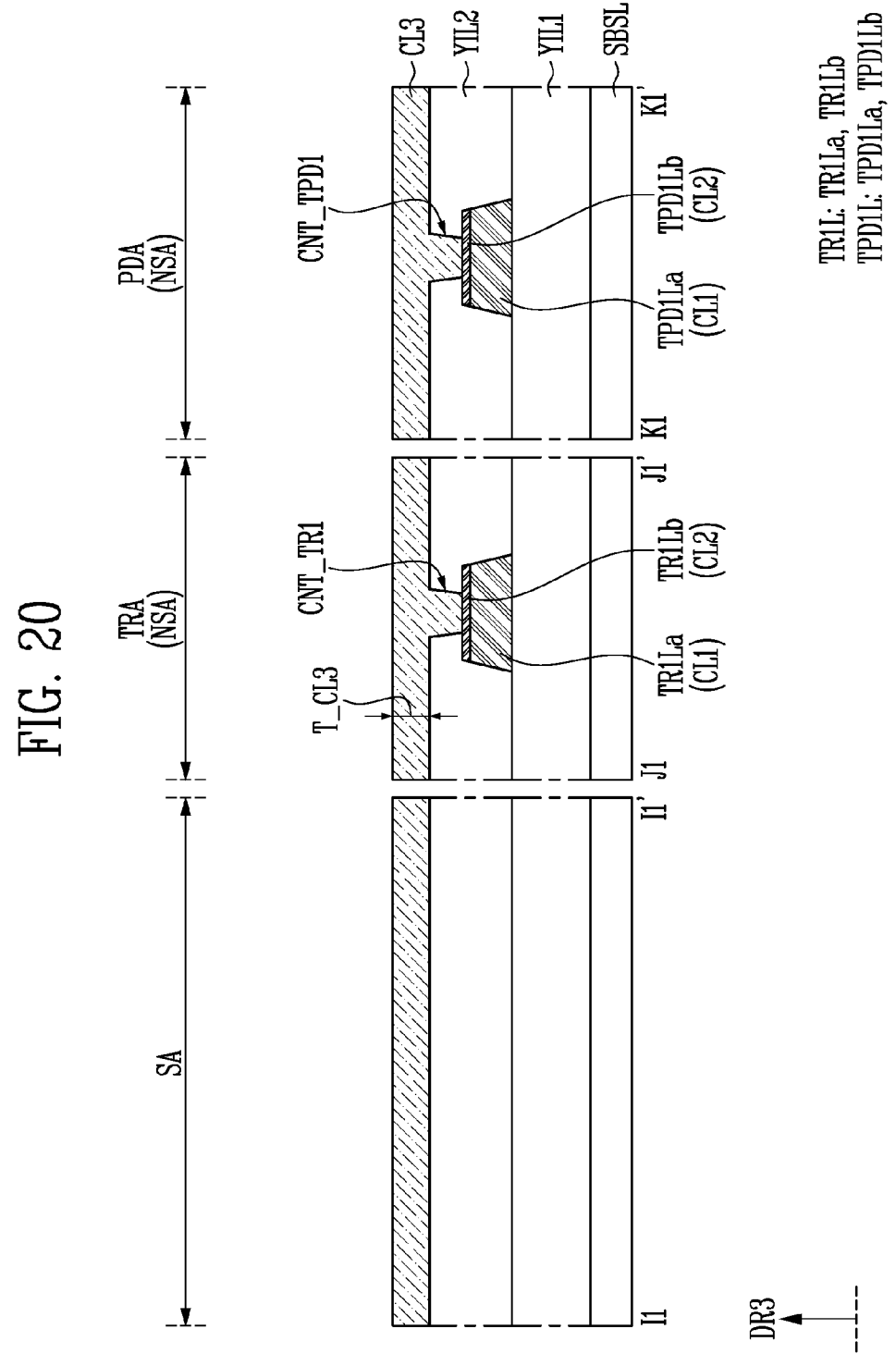
Figure 21:
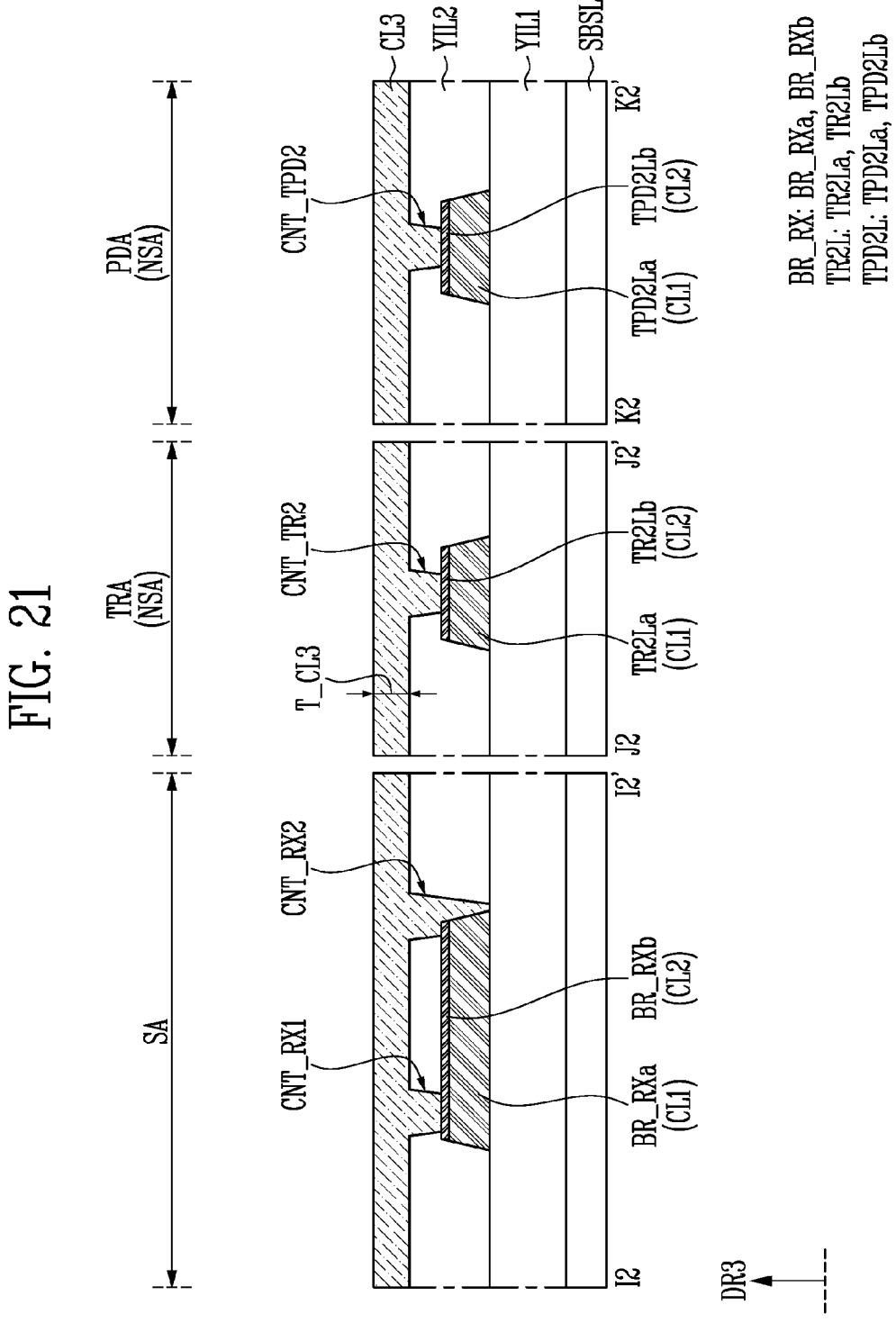

Referring to FIG. 20 and FIG. 21, a third conductive layer CL3 may be formed on the second insulating layer YIL2. The third conductive layer CL3 may be formed entirely in the sensing area SA and the non-sensing area NSA. The third conductive layer CL3 may be formed to fill the contact holes CNT_RX1, CNT_RX2, CNT_TR1, CNT_TR2, CNT_TPD1, and CNT_TPD2 formed in the second insulating layer YIL2.

According to some embodiments, the thickness T_CL3 of the third conductive layer CL3 in the third direction DR3 may be smaller than the thickness T_CL1 of the first conductive layer CL1 and larger than the thickness T_CL2 of the second conductive layer CL2. However, the thickness T_CL3 of the third conductive layer CL3 is not limited thereto.

Figure 22:
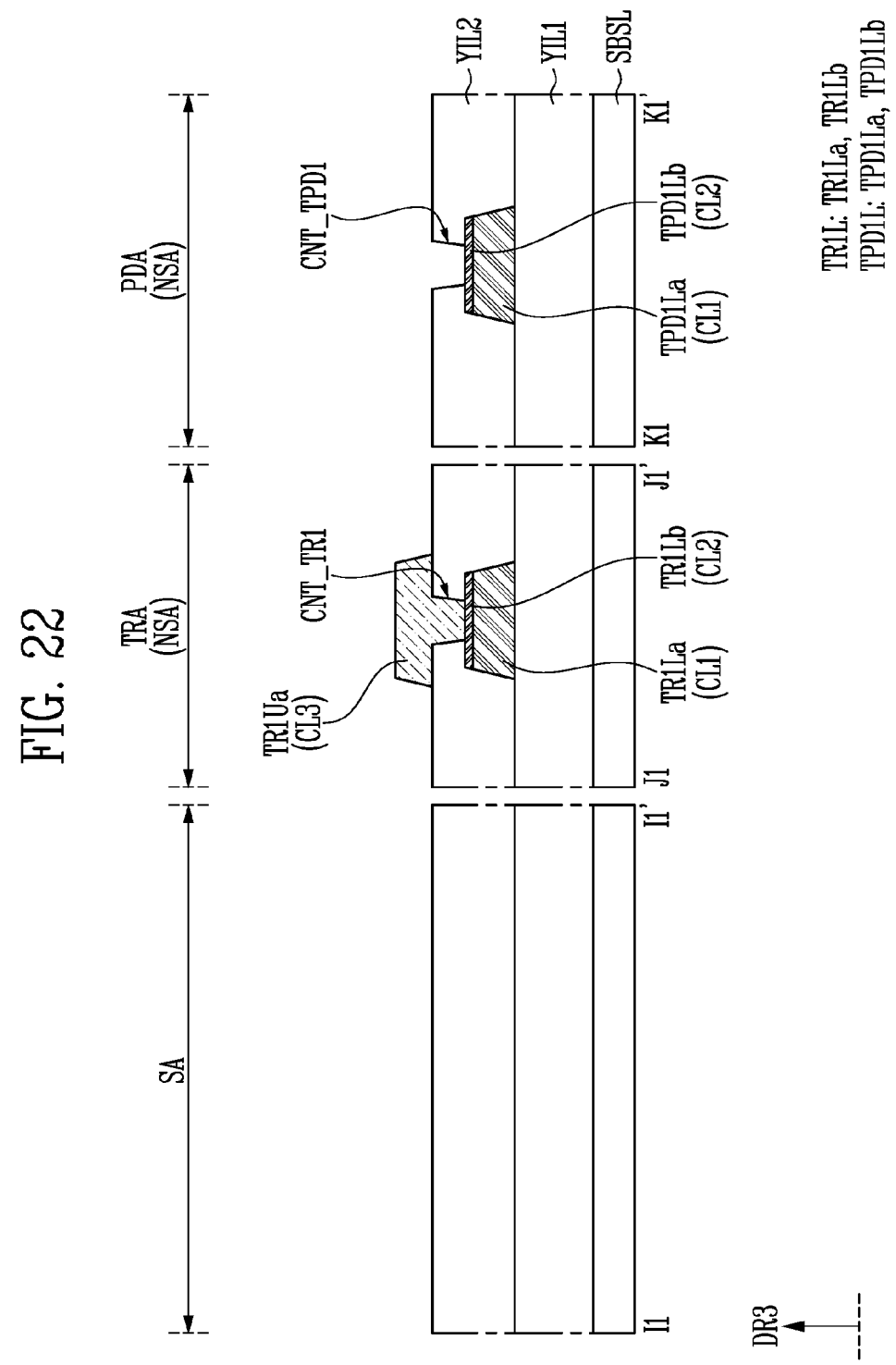
Figure 23:
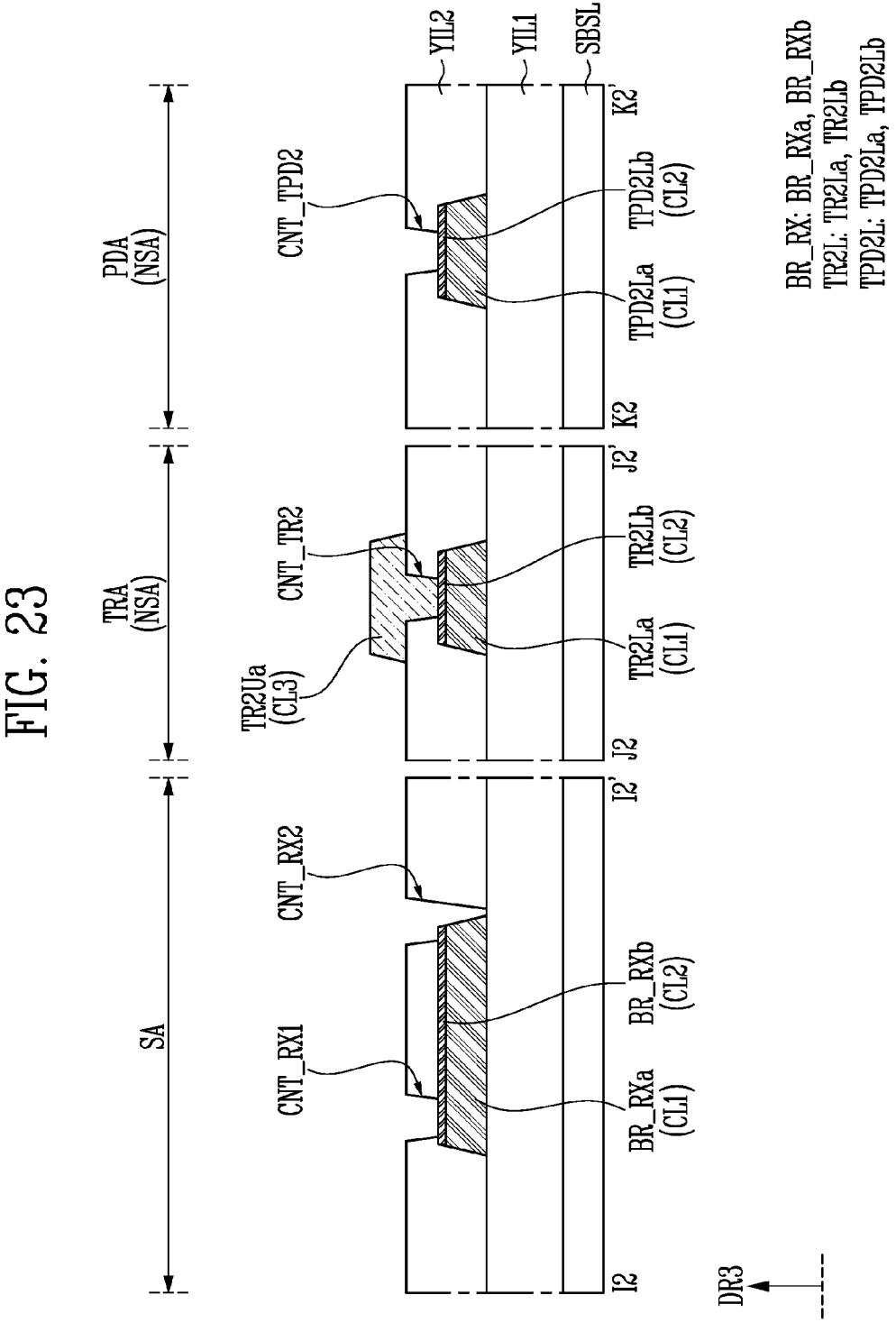

Referring to FIGS. 22 and 23, the third conductive layer CL3 may be patterned to form a 1-1 upper transmission line layer TR1Ua and a 2-1 upper transmission line layer TR2Ua.

Patterning of the third conductive layer CL3 may be performed by a patterning process using a third mask. With this patterning process, various known patterning processes may be applied without limitation.

FIGS. 24 to 27 are drawings for illustrating the fourth mask process (4MASK).

Figure 24:
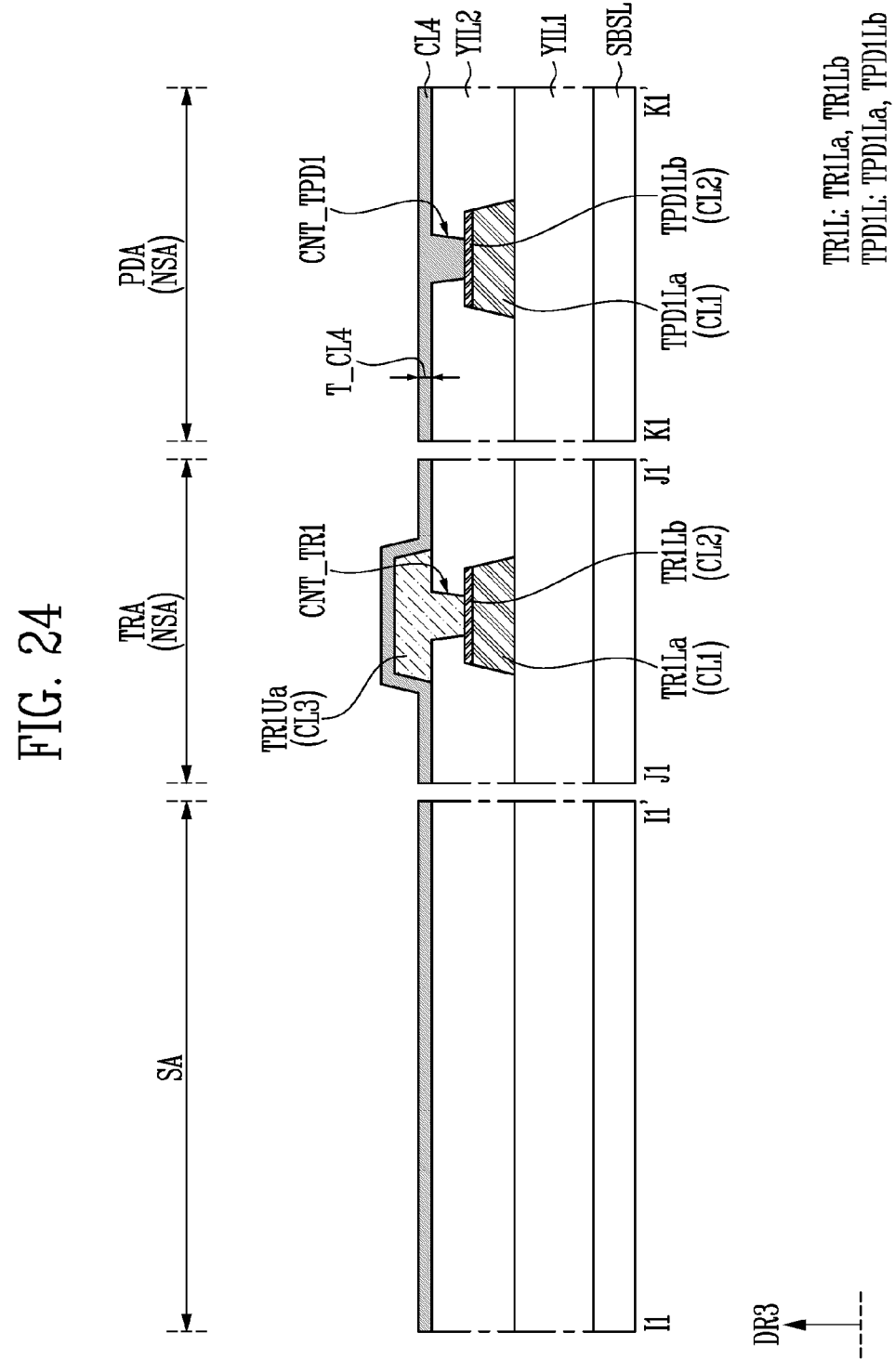
Figure 25:
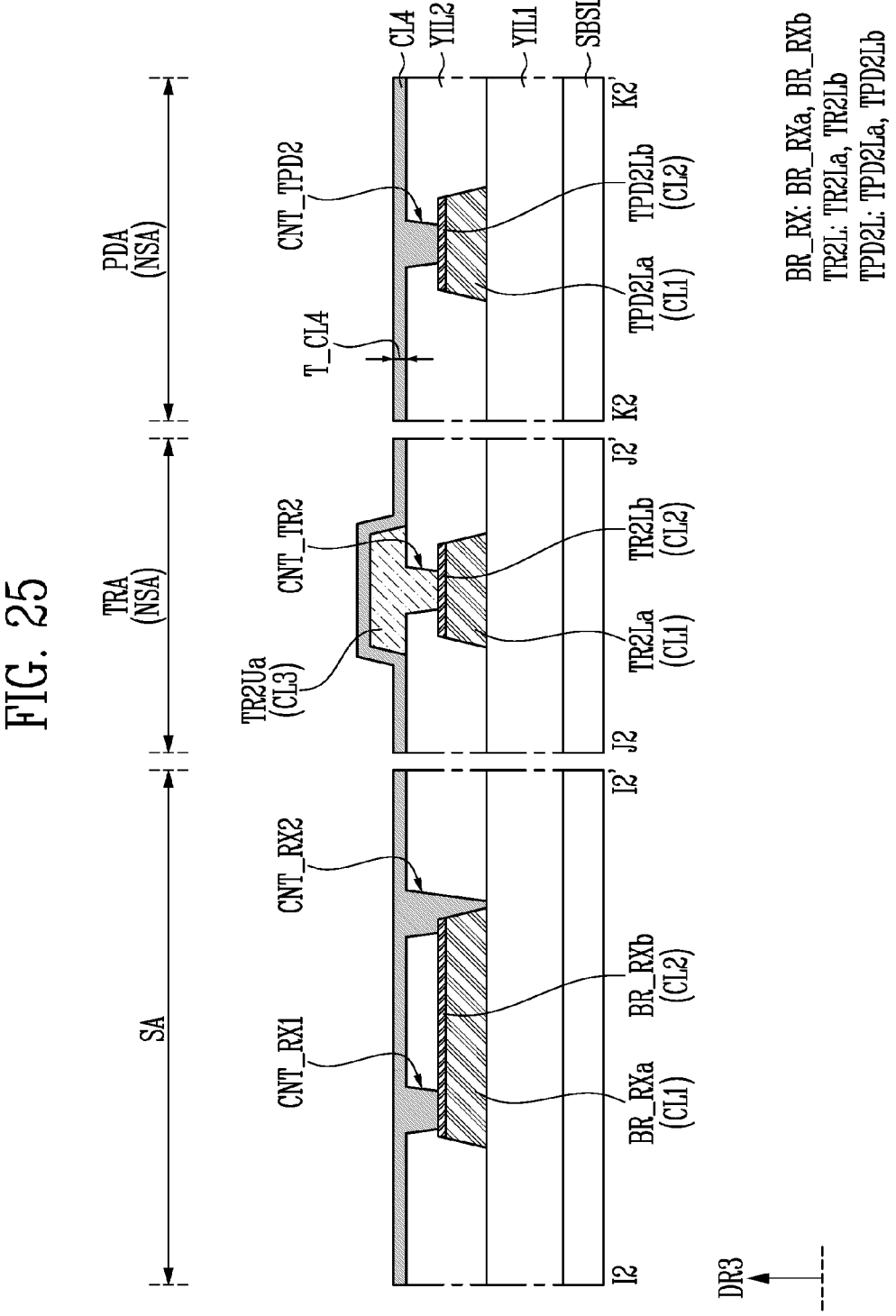

Referring to FIGS. 24 and 25, a fourth conductive layer CL4 may be formed on the second insulating layer YIL2, the 1-1 upper transmission line layer TR1Ua, and the 2-1 upper transmission line layer TR2Ua. The fourth conductive layer CL4 may be formed entirely in the sensing area SA and the non-sensing area NSA. The fourth conductive layer CL4 may be formed to fill the 2-1 electrode contact hole CNT_RX1, the 2-2 electrode contact hole CNT_RX2, the first pad contact hole CNT_TPD1, and the second pad contact hole CNT_TPD2 formed in the second insulating layer YIL2.

According to some embodiments, the thickness T_CL4 of the fourth conductive layer CL4 in the third direction DR3 may be smaller than the thickness T_CL3 of the third conductive layer CL3 and larger than the thickness T_CL2 of the second conductive layer CL2. However, the thickness T_CL4 of the fourth conductive layer CL4 is not limited thereto.

Figure 26:
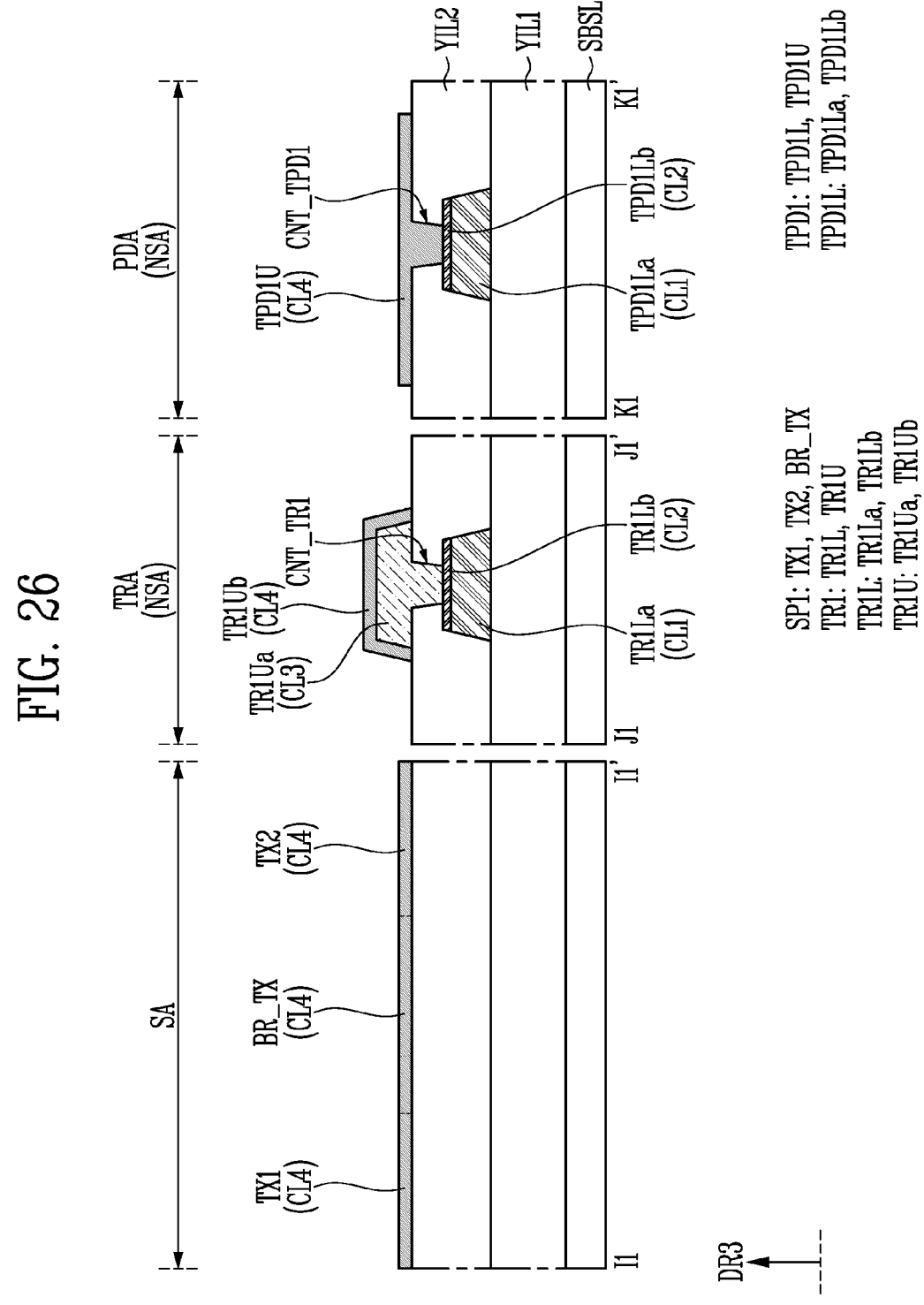
Figure 27:
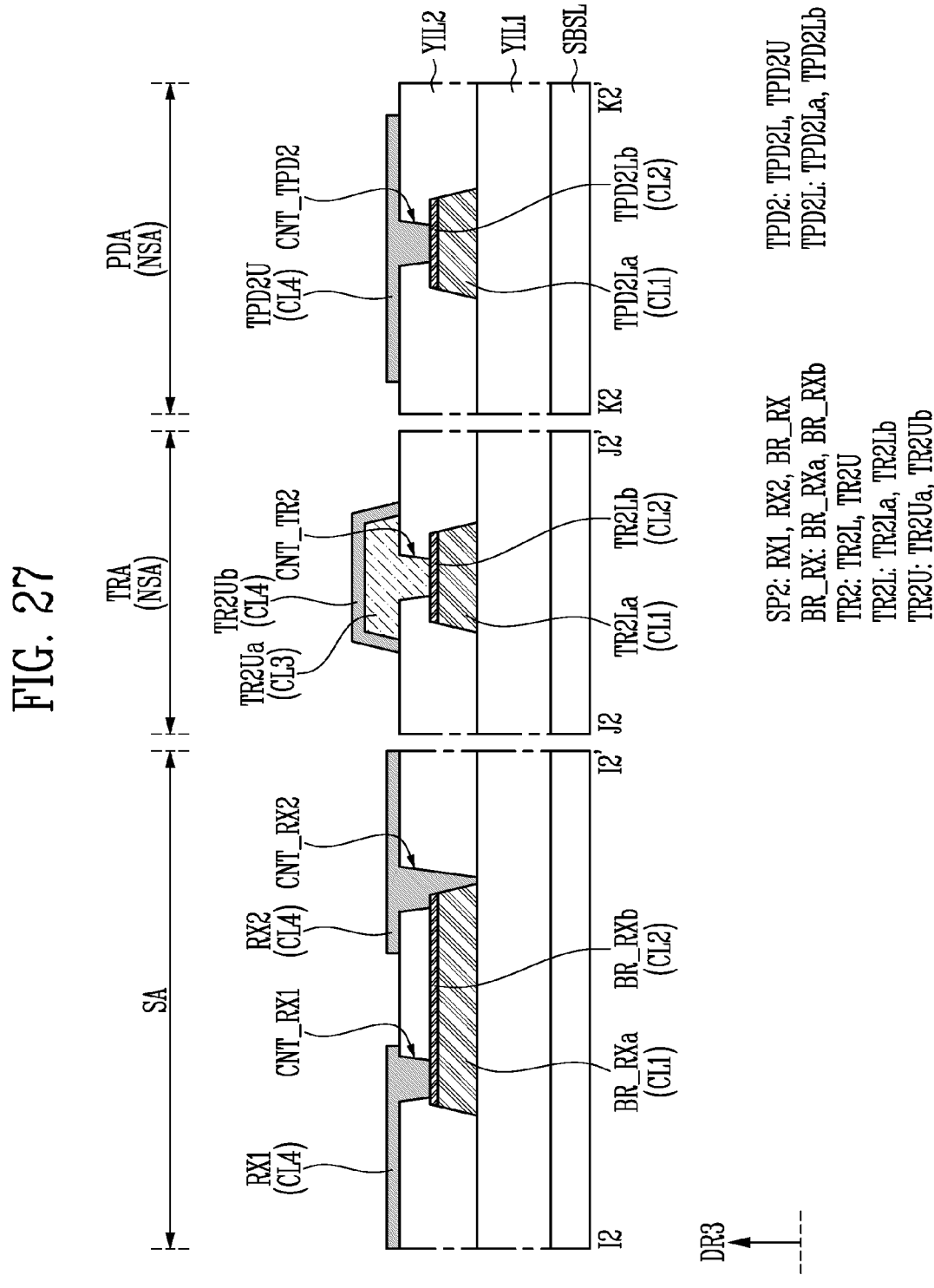

Referring to FIGS. 26 and 27, the fourth conductive layer CL4 may be patterned to form a 1-1 sensing electrode TX1, a 1-2 sensing electrode TX2, a first bridge electrode BR_TX, a 2-1 sensing electrode RX1, a 2-2 sensing electrode RX2, a 1-2 upper transmission line layer TR1Ub, a 2-2 upper transmission line layer TR2Ub, a first upper sensing pad TPD1U, and a second upper sensing pad TPD2U.

Patterning of the fourth conductive layer CL4 may be performed by a patterning process using a fourth mask. With this patterning process, various known patterning processes may be applied without limitation.

FIGS. 28 to 31 are drawings for illustrating the fifth mask process (5MASK).

Figure 28:
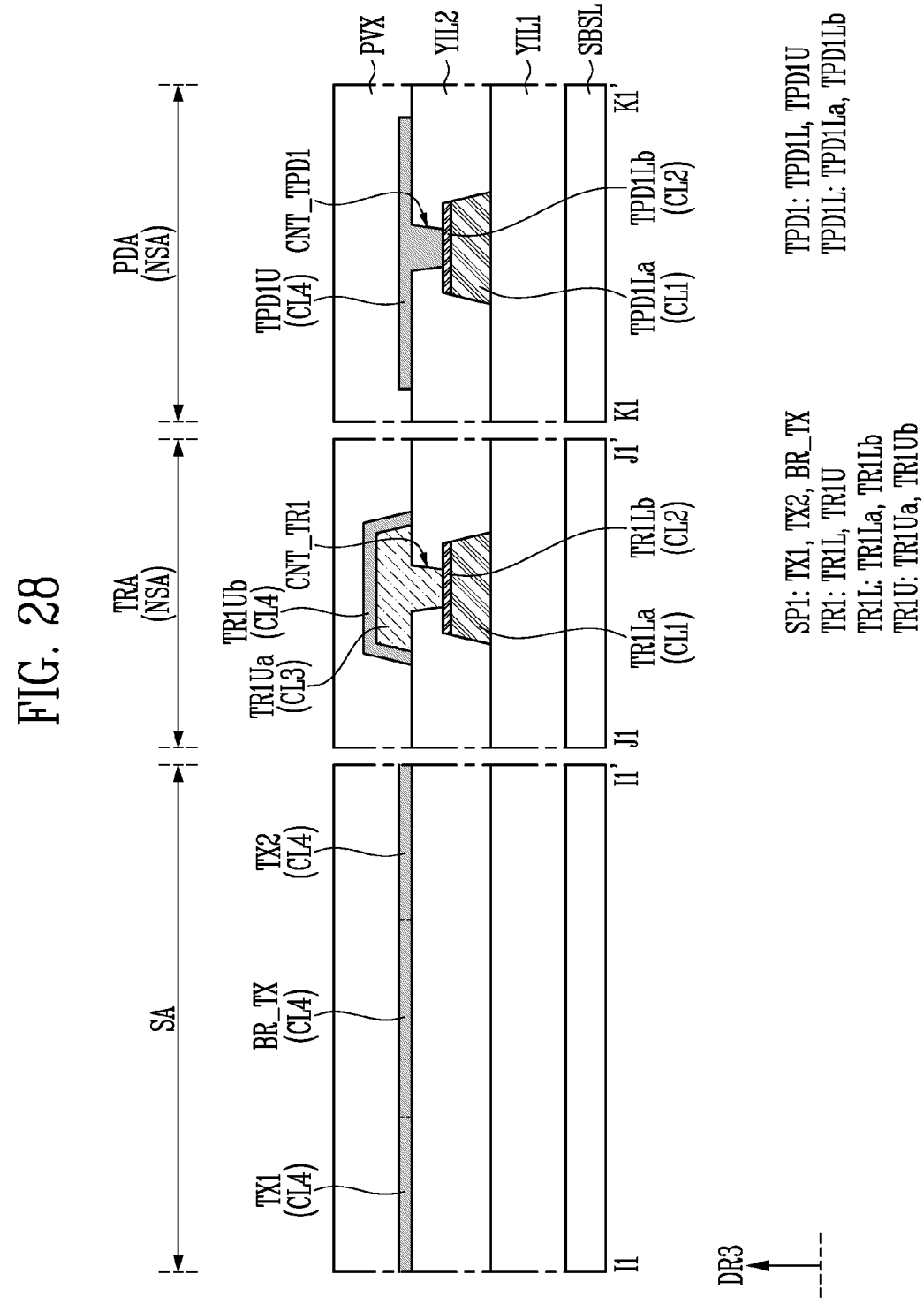
Figure 29:
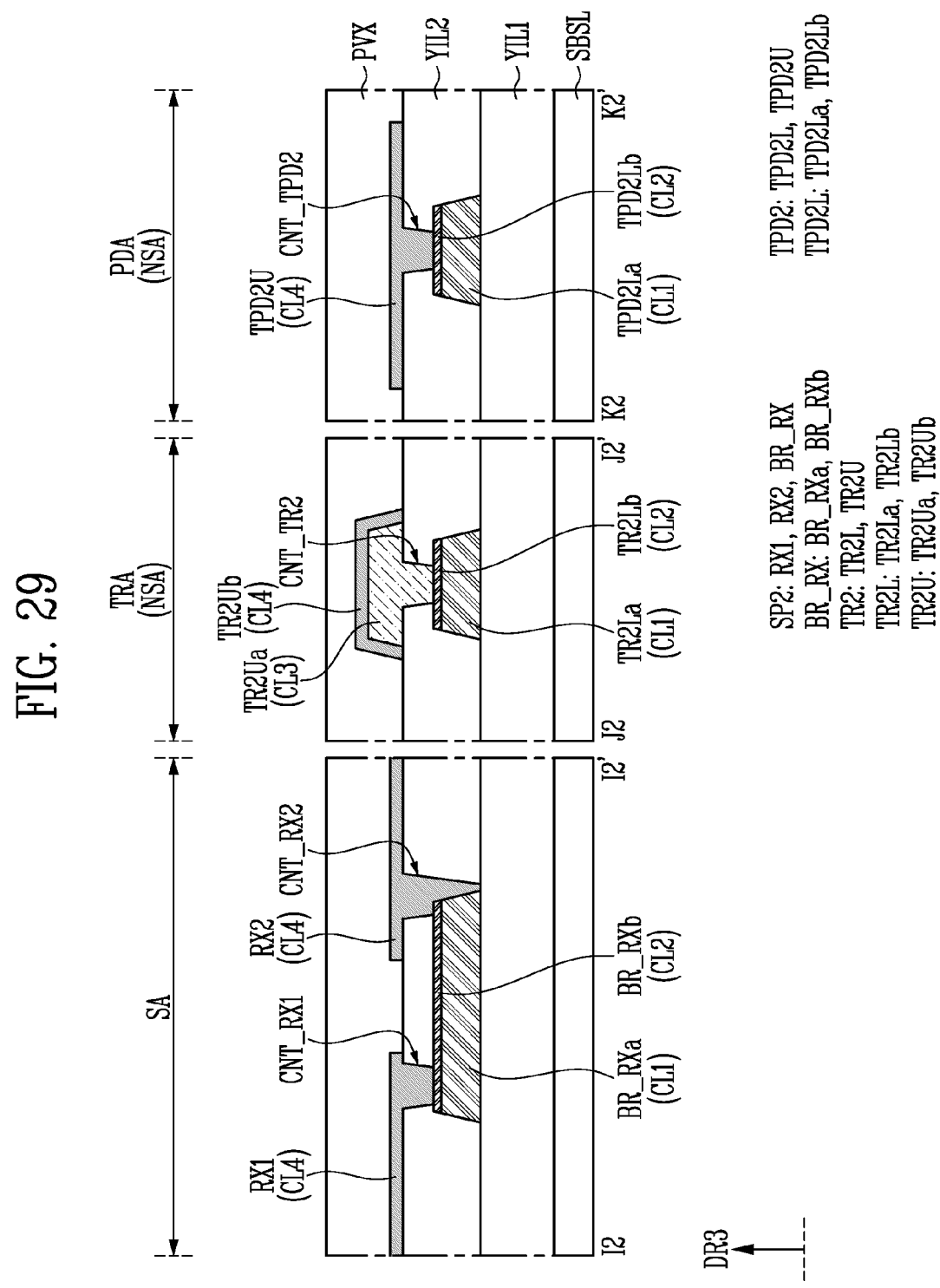

Referring to FIG. 28 and FIG. 29, a protective layer PVX may be formed on the second insulating layer YIL2, the 1-1 sensing electrode TX1, the 1-2 sensing electrode TX2, the first bridge electrode BR_TX, the 2-1 sensing electrode RX1, the 2-2 sensing electrode RX2, the 1-2 upper transmission line layer TR1Ub, the 2-2 upper transmission line layer TR2Ub, the first upper sensing pad TPD1U, and the second upper sensing pad TPD2U. The protective layer PVX may be formed entirely in the sensing area SA and the non-sensing area NSA.

Figure 30:
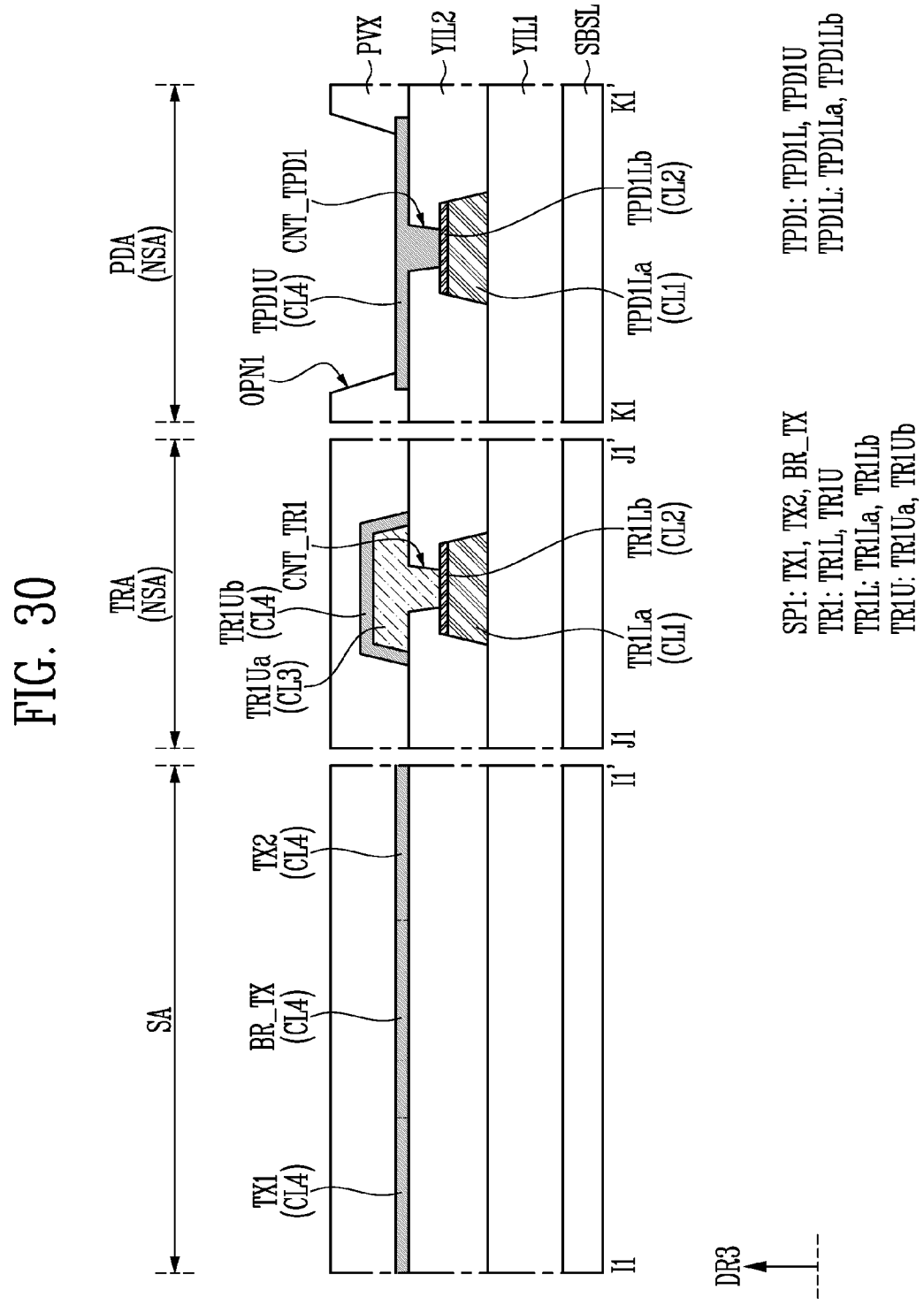
Figure 31:
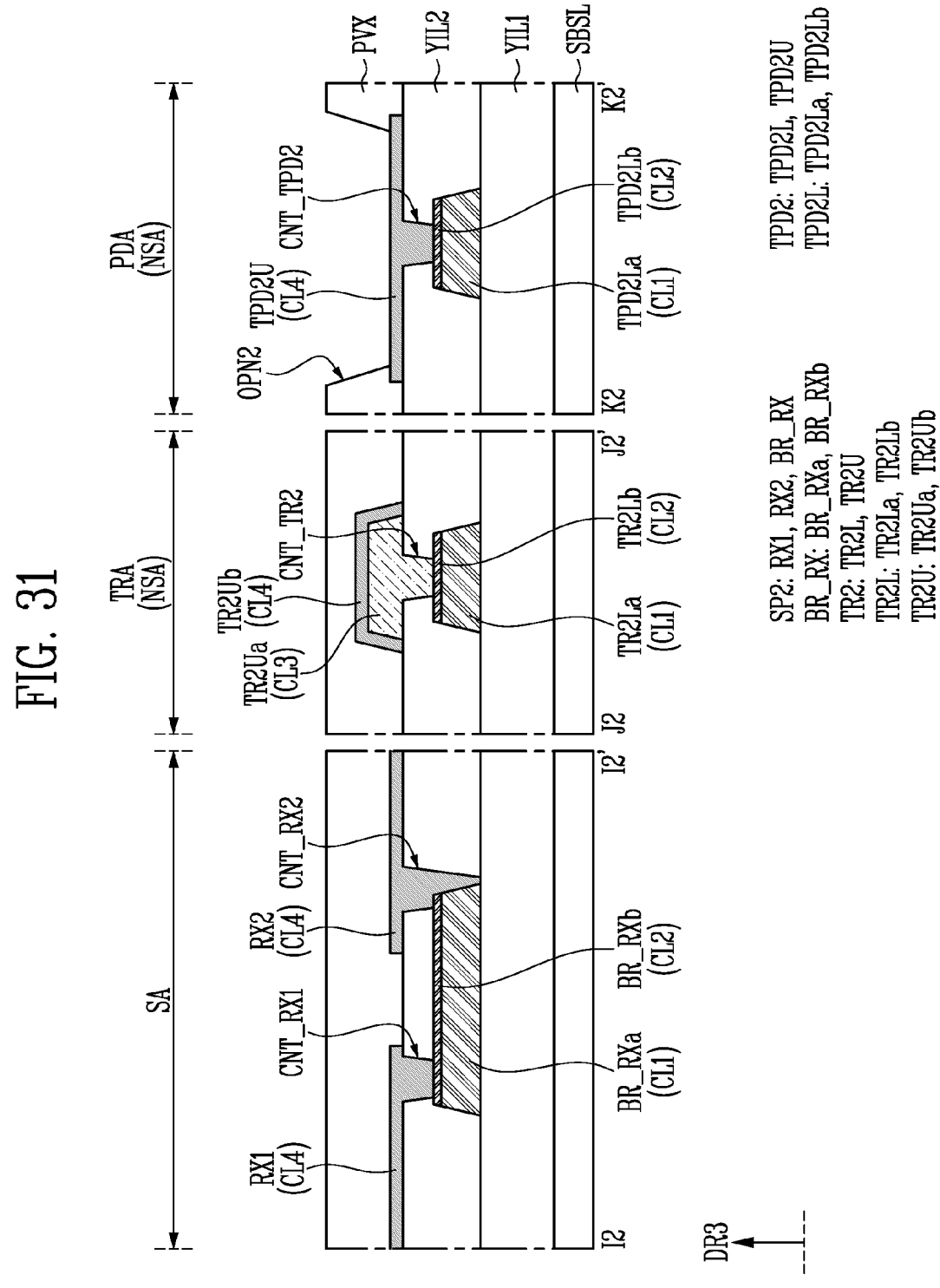

Referring to FIGS. 30 and 31, may be formed by patterning a protective layer PVX may be patterned to form a first pad opening OPN1 and a second pad opening OPN2.

Patterning of the protective layer PVX may be performed by a patterning process using a fifth mask. With this patterning process, various known patterning processes may be applied without limitation.

Referring again to FIGS. 11 to 31, in the manufacturing method of the display device DD of the present invention, a total of five masks may be used to form the input sensor TSP. In this way, according to the manufacturing method of the display device DD of the present invention, because a relatively small number of masks are used to form the input sensor TSP, the process difficulty may be relatively reduced.

While the present invention has been shown and described with reference to certain embodiments thereof, it will be understood by those skilled in the art that various changes in forms and details may be made therein without departing from the spirit and scope of embodiments according to the present invention as defined by the appended claims and their equivalents.

Figure 32:
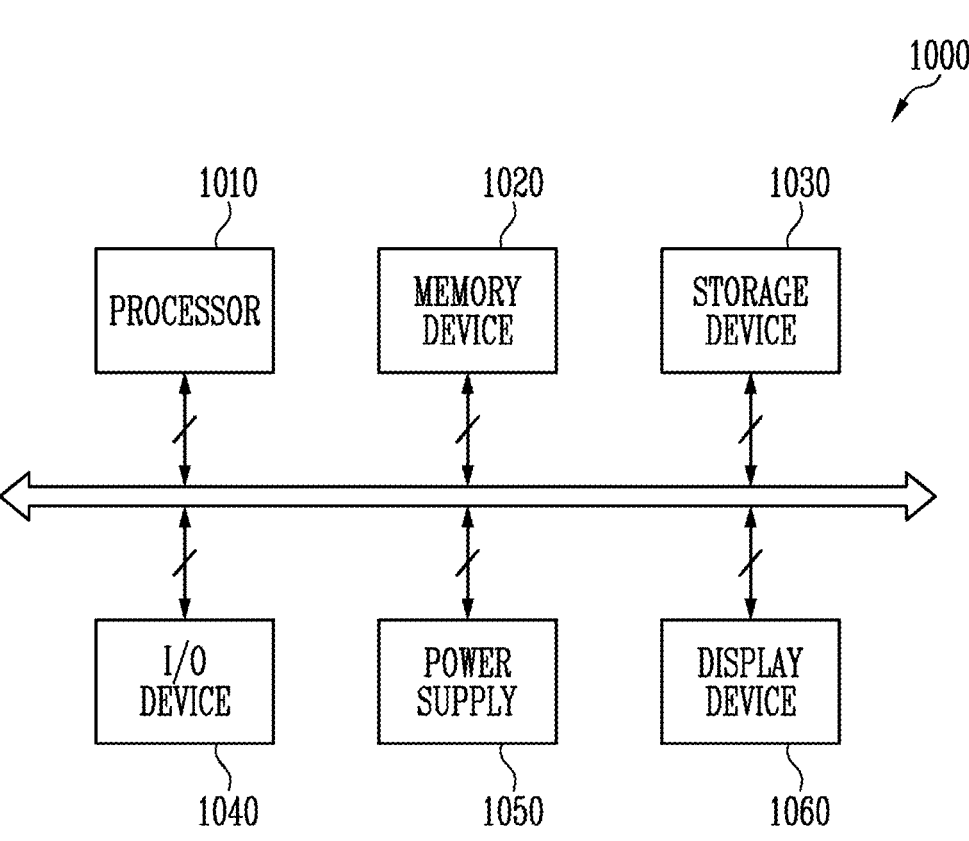
FIG. 32 is a schematic block diagram illustrating an electronic device including a display device according to some embodiments.
Figure 33:
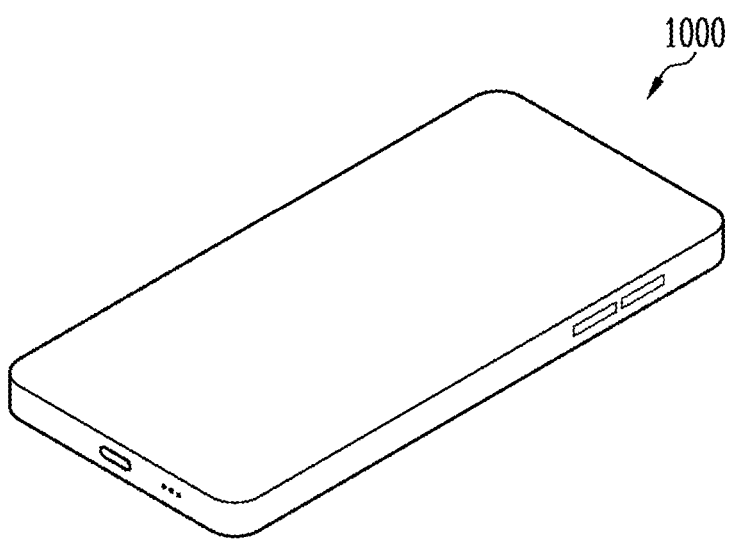
FIG. 33 is a schematic diagram illustrating an example where the electronic device of FIG. 32 is a smartphone.
Figure 34:
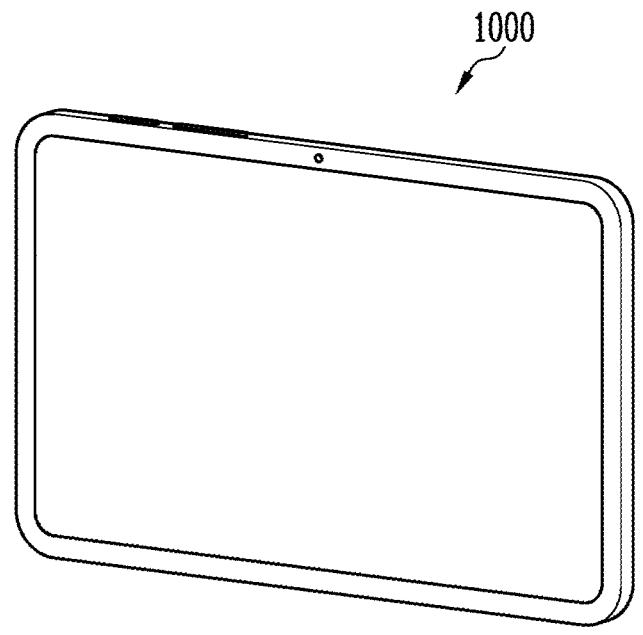
FIG. 34 is a schematic diagram illustrating an example where the electronic device of FIG. 32 is a tablet computer.

FIG. 32 is a schematic block diagram illustrating an electronic device including a display device according to some embodiments. FIG. 33 is a schematic diagram illustrating an example where the electronic device of FIG. 32 is a smartphone. FIG. 34 is a schematic diagram illustrating an example where the electronic device of FIG. 32 is a tablet computer.

Referring to FIGS. 32 to 34, the electronic device 1000 may include a processor 1010, a memory device 1020, a storage device 1030, an input/output (I/O) device 1040, a power supply 1050, and a display device 1060. The display device 1060 may be the display device DD of FIGS. 1 to 10. The electronic device 1000 may further include various ports for communication with a video card, a sound card, a memory card, a USB device, or other systems. According to some embodiments, as illustrated in FIG. 33, the electronic device 1000 may be a smartphone. According to some embodiments, as illustrated in FIG. 34, the electronic device 1000 may be a tablet computer. However, the aforementioned examples are illustrative, and the electronic device 1000 is not necessarily limited to the aforementioned examples. For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. According to some embodiments, the processor 1010 may be a microprocessor, a central processing unit, an application processor, or the like. The processor 1010 may be connected to other components through an address bus, a control bus, a data bus, and the like. According to some embodiments, the processor 1010 may be connected to an expansion bus such as a peripheral component interconnect (PCI) bus. According to some embodiments, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. According to some embodiments, the display device 1060 may be integrated with the I/O device 1040.

The power supply 1050 may supply power needed to perform the operation of the electronic device 1000. For example, the power supply 1050 may include a power management integrated circuit (PMIC). According to some embodiments, the power supply 1050 may supply power to the display device 1060.

The display device 1060 may display images in response to control signals or data from the processor 1010. The display device 1060 may be connected to other components through the buses or other communication links.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A display device comprising:
   a display panel including sub-pixels; and
   an input sensor on the display panel, wherein
   the input sensor includes a sensing electrode array including a first sensing electrode array and a second sensing electrode array that are insulated from each other and intersect each other, and a transmission line electrically connected to the sensing electrode array,
   the transmission line includes a lower transmission line and an upper transmission line on the lower transmission line and electrically connected to the lower transmission line through a line contact hole formed in a sensing insulating layer,
   the lower transmission line includes a first layer including MoNb and a second layer on the first layer and including indium tin oxide (ITO),
   the upper transmission line includes a third layer including AlNd and a fourth layer on the third layer and including ITO,
   the first sensing electrode array includes a first sensing electrode including ITO and a first bridge electrode electrically connected to the first sensing electrode and including ITO,
   the second sensing electrode array includes a second sensing electrode including ITO and a second bridge electrode electrically connected to the second sensing electrode, and the second bridge electrode includes a 2-1 bridge electrode layer including MoNb and a 2-2 bridge electrode layer on the 2-1 bridge electrode layer and including ITO.

2. The display device of claim 1, wherein
   the second layer covers an upper surface of the first layer and exposes side surfaces of the first layer, and
   the fourth layer covers an upper surface and side surfaces of the third layer.

3. The display device of claim 2, wherein the third layer is electrically connected to the second layer through the line contact hole formed in the sensing insulating layer interposed between the third layer and the second layer.

4. The display device of claim 3, wherein a plurality of line contact holes are formed to electrically connect the third layer and the second layer.

5. The display device of claim 1, wherein the first sensing electrode includes a 1-1 sensing electrode and a 1-2 sensing electrode spaced apart from each other in a first direction.

6. The display device of claim 5, wherein the first bridge electrode is on a same layer as the 1-1 sensing electrode and the 1-2 sensing electrode, and is electrically connected to each of the 1-1 sensing electrode and the 1-2 sensing electrode.

7. The display device of claim 5, wherein the second sensing electrode includes a 2-1 sensing electrode and a 2-2 sensing electrode spaced apart from each other in a second direction intersecting the first direction.

8. The display device of claim 7, wherein
   the sensing insulating layer is interposed between the second bridge electrode and the second sensing electrode,
   the 2-1 sensing electrode is electrically connected to the second bridge electrode through a 2-1 electrode contact hole formed in the sensing insulating layer, and
   the 2-2 sensing electrode is electrically connected to the second bridge electrode through a 2-2 electrode contact hole formed in the sensing insulating layer.

9. The display device of claim 8, wherein the 2-2 bridge electrode layer covers an upper surface of the 2-1 bridge electrode layer and exposes side surfaces of the 2-1 bridge electrode layer.

10. The display device of claim 9, wherein
    the 2-1 electrode contact hole exposes an upper surface of the 2-2 bridge electrode layer, and
    the 2-2 electrode contact hole exposes the upper surface of the 2-2 bridge electrode layer, a side surface of the 2-2 bridge electrode layer, and a side surface of the 2-1 bridge electrode layer.

11. The display device of claim 1, wherein the input sensor further includes a sensing pad electrically connected to the sensing electrode array through the transmission line.

12. The display device of claim 11, wherein the sensing pad includes:
    a first pad layer including MoNb;
    a second pad layer on the first pad layer and including ITO; and
    a third pad layer on the second pad layer and including ITO, wherein
    the second pad layer covers an upper surface of the first pad layer and exposes side surfaces of the first pad layer.

13. The display device of claim 12, wherein the third pad layer is electrically connected to the second pad layer through a pad contact hole formed in the sensing insulating layer interposed between the third pad layer and the second pad layer.

14. The display device of claim 12, wherein the input sensor further includes a protective layer on the third pad layer and including a pad opening exposing at least a portion of the third pad layer.

15. A display device comprising:

a display panel; and an input sensor on the display panel, wherein the input sensor includes:

a sensing electrode in a sensing area;

a transmission line in a line area around the sensing area; and a sensing insulating layer entirely in the sensing area and the line area, wherein the transmission line includes:

a first metal layer including MoNb;

a second metal layer on the first metal layer, electrically connected to the first metal layer, and including indium tin oxide (ITO);

a third metal layer on the sensing insulating layer, electrically connected to the second metal layer through a line contact hole formed in the sensing insulating layer, and including AlNd; and a fourth metal layer on the third metal layer, electrically connected to the third metal layer, and including ITO, wherein the sensing electrodes includes:

a sensing pattern on the sensing insulating layer and including ITO; and a bridge pattern under the sensing insulating layer, electrically connected to the sensing pattern, and including MoNb and ITO.

16. The display device of claim 15, wherein the second metal layer covers an upper surface of the first metal layer and exposes side surfaces of the first metal layer, and the fourth metal layer covers an upper surface and side surfaces of the third metal layer.

17. The display device of claim 15, wherein the sensing pattern includes first sensing electrodes arranged in a first direction and second sensing electrodes arranged in a second direction intersecting the first direction.

18. The display device of claim 17, wherein the second sensing electrodes are electrically connected to the bridge pattern through an electrode contact hole formed in the sensing insulating layer.

19. The display device of claim 15, wherein the bridge pattern includes a first bridge pattern layer including MoNb and a second bridge pattern layer including ITO, covering an upper surface of the first bridge pattern layer and exposing side surfaces of the first bridge pattern layer.

20. An electronic device, comprising:

a processor configured to provide input image data; and a display device configured to display an image based on the input image data, wherein the display device includes a display panel including sub-pixels, and an input sensor on the display panel, the input sensor includes a sensing electrode array including a first sensing electrode array and a second sensing electrode array that are insulated from each other and intersect each other, and a transmission line electrically connected to the sensing electrode array, the transmission line includes a lower transmission line and an upper transmission line on the lower transmission line and electrically connected to the lower transmission line through a line contact hole formed in a sensing insulating layer, the lower transmission line includes a first layer including MoNb and a second layer on the first layer and including indium tin oxide (ITO), the upper transmission line includes a third layer including AlNd and a fourth layer on the third layer and including ITO, the first sensing electrode array includes a first sensing electrode including ITO and a first bridge electrode electrically connected to the first sensing electrode and including ITO, the second sensing electrode array includes a second sensing electrode including ITO and a second bridge electrode electrically connected to the second sensing electrode, and the second bridge electrode includes a 2-1 bridge electrode layer including MoNb and a 2-2 bridge electrode layer on the 2-1 bridge electrode layer and including ITO.

* * * * *